(12) United States Patent
Itoh

(10) Patent No.: US 7,672,685 B2
(45) Date of Patent: Mar. 2, 2010

(54) TRANSMITTER AND TRANSMISSION CONTROL METHOD, AND RECEIVER AND RECEPTION CONTROL METHOD

(75) Inventor: Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 249 days.

(21) Appl. No.: 10/450,689

(22) PCT Filed: Aug. 28, 2002

(86) PCT No.: PCT/JP02/08648

§ 371 (c)(1),
(2), (4) Date: Sep. 20, 2004

(87) PCT Pub. No.: WO03/034677

PCT Pub. Date: Apr. 24, 2003

(65) Prior Publication Data

US 2005/0031019 A1    Feb. 10, 2005

(30) Foreign Application Priority Data

Oct. 17, 2001  (JP)  ............................. 2001-319841

(51) Int. Cl.
*H04B 7/00* (2006.01)
(52) U.S. Cl. ...................... 455/522; 370/318
(58) Field of Classification Search ............... 455/522, 455/127.1, 69, 63, 70, 63.1, 65, 67.13; 375/142; 370/318
See application file for complete search history.

(56) References Cited

U.S. PATENT DOCUMENTS 6,097,774 A * 8/2000 Sohlman et al. ............. 375/347

6,285,886 B1 * 9/2001 Kamel et al. ................ 455/522
6,449,462 B1 * 9/2002 Gunnarsson et al. ..... 455/67.13

(Continued)

FOREIGN PATENT DOCUMENTS

EP    0 963 074    12/1999

(Continued)

OTHER PUBLICATIONS

Tugay Eyceoz et al: "Deterministic Channel Modeling and Long Range Prediction of Fast Fading Mobile Radio Channels" IEEE Communications Letters, IEEE Service Center, Piscataway, NJ, US, vol. 2, No. 9, Sep. 1998, XP011010613 ISSN: 1089-7798.

*Primary Examiner*—Raymond S Dean
(74) *Attorney, Agent, or Firm*—Frommer Lawrence & Haug LLP; William S. Frommer; Paul A. Levy

(57) ABSTRACT

A base station carries out training for obtaining correlation information that correlates the reception quality of a packet channel transmitted from a terminal and the transmission power of an associated channel, and based on the correlation information, uses the transmission power of the associated channel to obtain a predicted value of the reception quality of the packet channel, and controls the transmission of data through the packet channel based on that predicted value. The base station transmits through the associated channel transmission control information for controlling the transmission of the reception quality of the packet channel by the terminal. The terminal controls the transmission of the reception quality of the packet channel based on the transmission control information included in the data of the associated channel transmitted from the base station.

26 Claims, 24 Drawing Sheets

U.S. PATENT DOCUMENTS

| | | | |
|---|---|---|---|
| 6,724,740 B1 * | 4/2004 | Choi et al. | 370/335 |
| 6,810,264 B1 * | 10/2004 | Park et al. | 455/522 |
| 6,832,095 B2 * | 12/2004 | Haim | 455/522 |
| 6,898,412 B2 * | 5/2005 | Hayashihara | 455/1 |
| 6,947,479 B2 * | 9/2005 | Varma et al. | 375/224 |
| 7,027,420 B2 * | 4/2006 | Hamalainen | 370/335 |

FOREIGN PATENT DOCUMENTS

| | | |
|---|---|---|
| JP | 10-93650 | 4/1998 |
| JP | 11-355373 | 12/1999 |
| JP | 2002-199033 | 7/2002 |
| WO | WO 99 12304 | 3/1999 |
| WO | WO 99 46869 | 9/1999 |
| WO | WO 01 71926 | 9/2001 |

* cited by examiner

FIG.3

| MODE | CODE RATE | MODULATION METHOD |
|---|---|---|
| 0 | R=1/2 | QPSK |
| 1 | R=1/2 | 16-QAM |
| 2 | R=3/4 | 16-QAM |

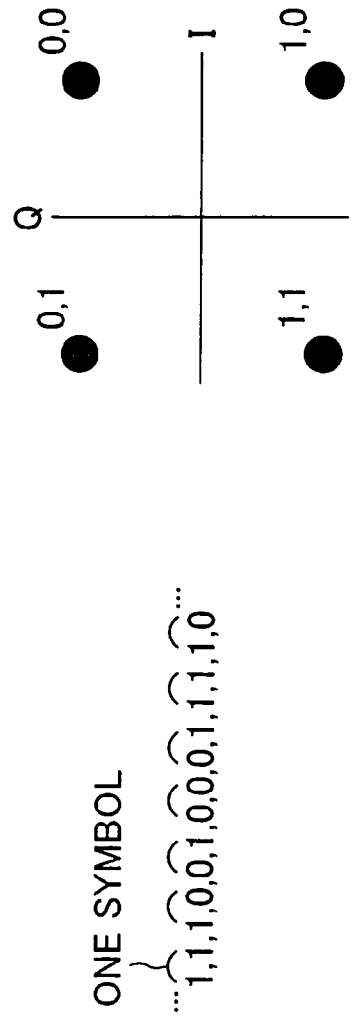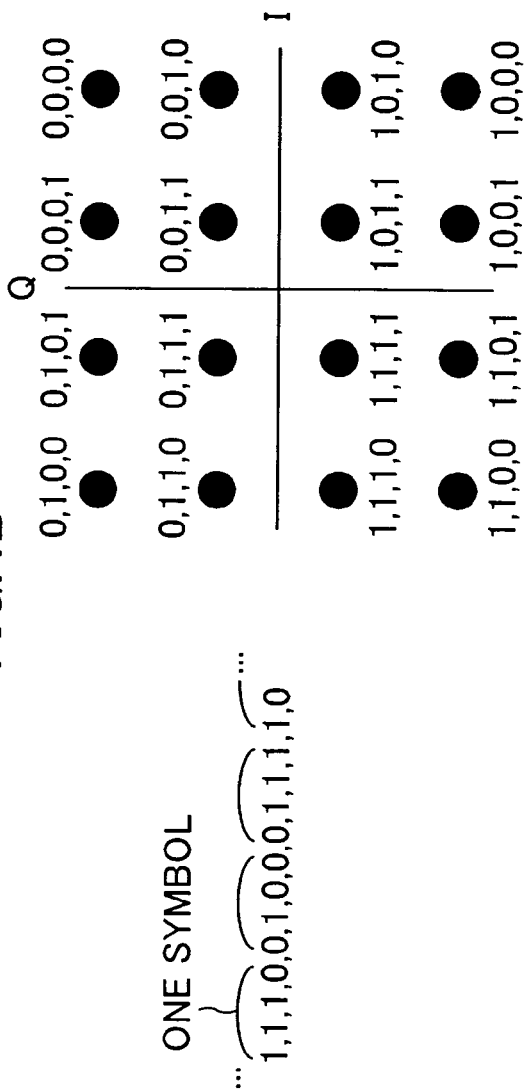

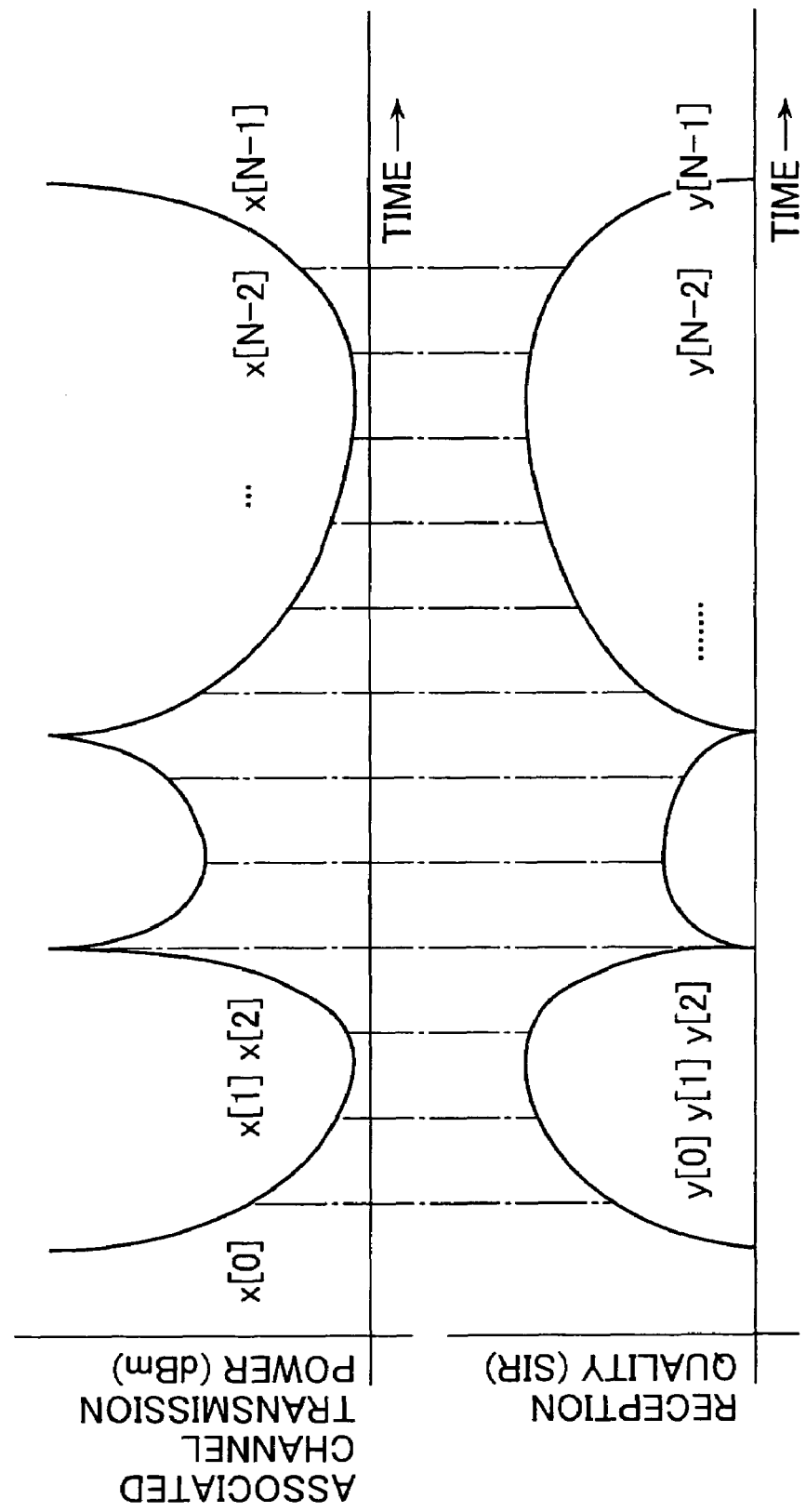

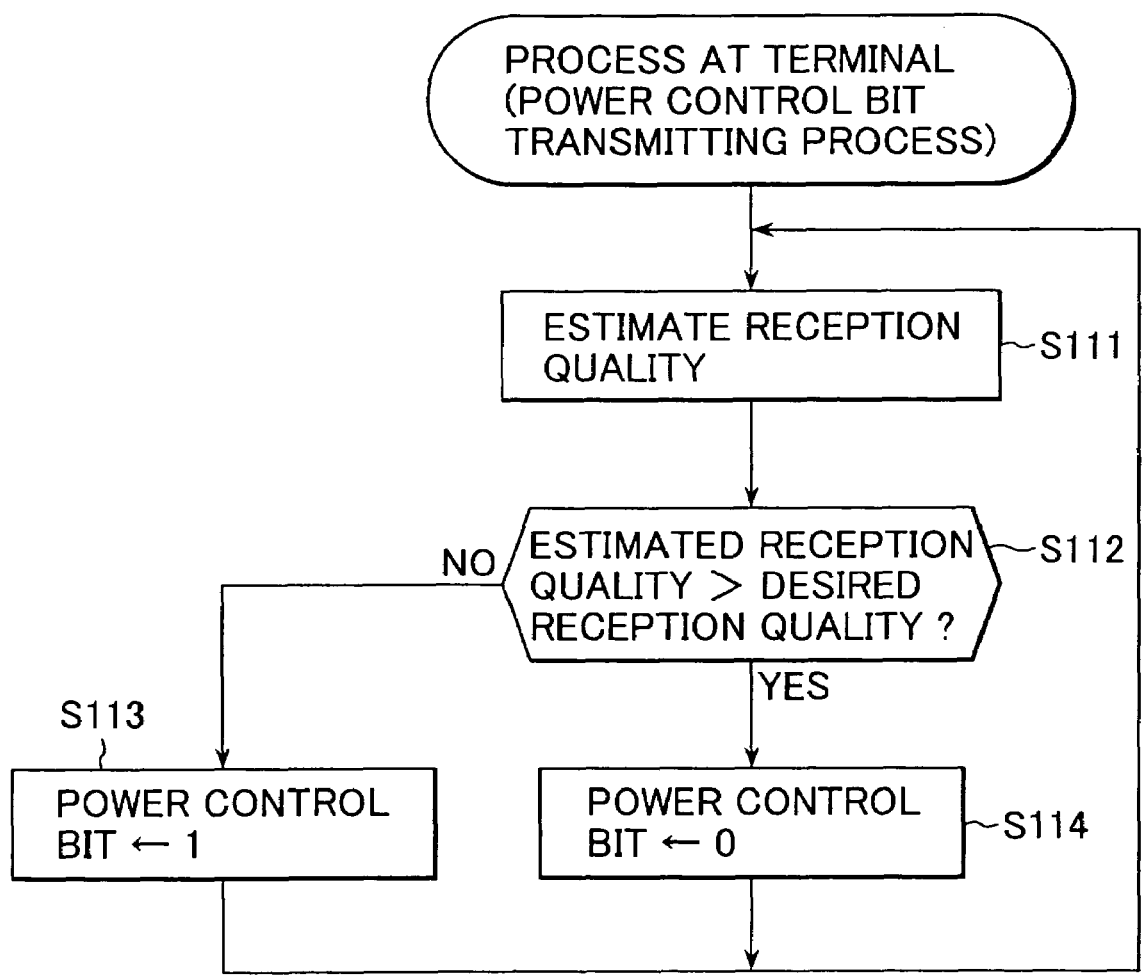

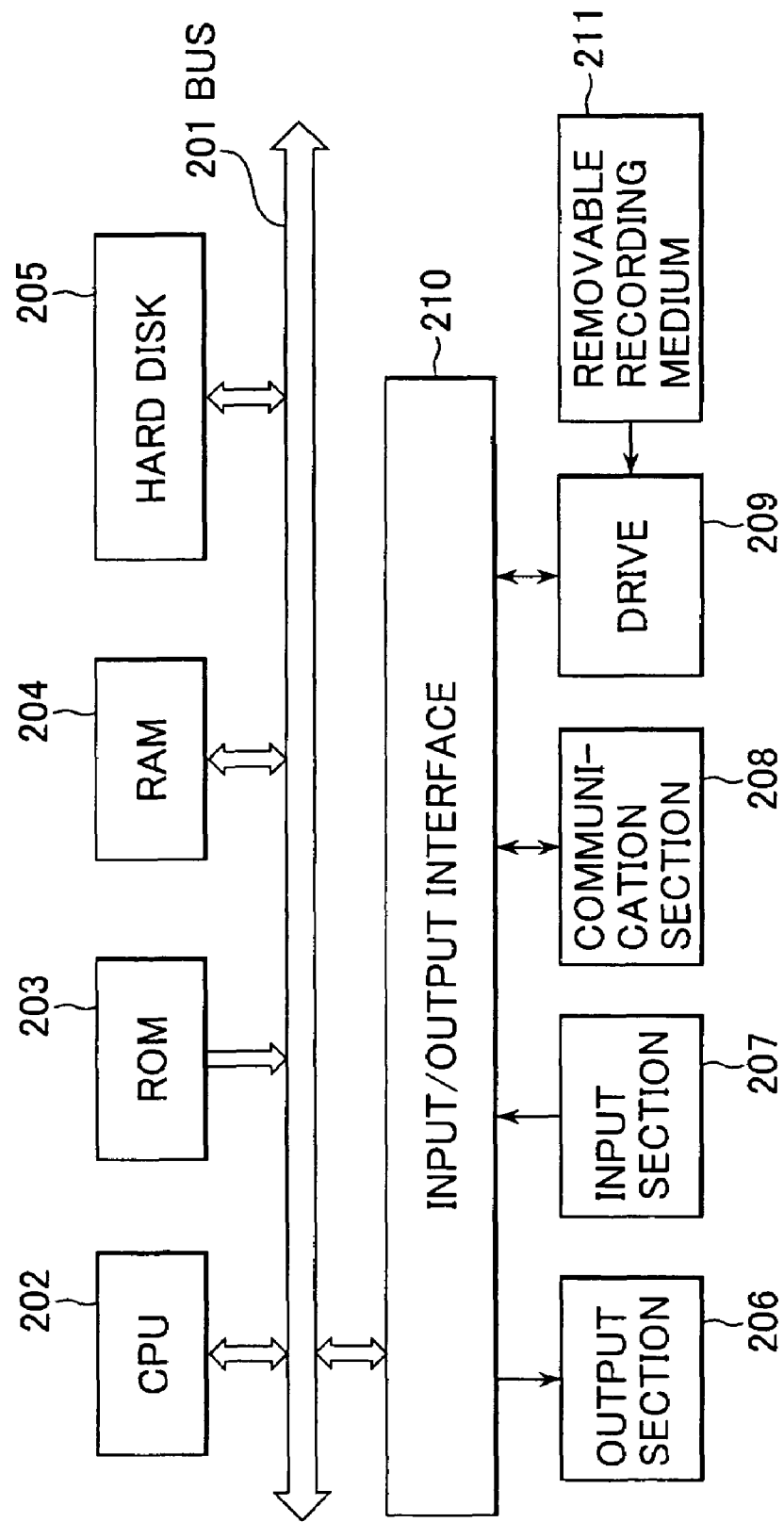

TRANSMITTER AND TRANSMISSION CONTROL METHOD, AND RECEIVER AND RECEPTION CONTROL METHOD

TECHNICAL FIELD

The present invention relates to a method of estimating reception quality, and more particularly to a method of estimating the reception quality of a packet channel for communicating data from the transmission power of an associated channel for communicating audio and the like in a system for carrying out simultaneous communications in a plurality of channels. That is, the present invention relates to a transmission apparatus, a transmission control method, a reception apparatus and a reception control method. More particularly, the present invention relates to a transmission apparatus, a transmission control method, a reception apparatus and a reception control method which, for example, in a communications system comprising a terminal for reporting the reception quality of a channel to a base station, and the base station for controlling transmission of data through the channel based on the reception quality from the terminal, reduces the power consumption of the terminal and also makes it possible to save radio resources.

BACKGROUND ART

In recent radio communications systems, instead of accommodating a single modulation and encoding system, using an adaptive modulation and code rate communications system that controls so as to perform communications by way of an optimum system depending on the conditions for communications is proposed.

Communications systems using adaptive modulation and code rate (hereafter, referred to as an adaptive encoding modulation system where appropriate) change the code rate of an error correction code and the degree of multi-valued modulation depending on the quality of a propagation path, and provides high-speed data communications to a user, whose propagation path has a high quality, at the expense of noise durability characteristics, and provide low-speed data communications to a user, whose propagation path has poor quality, putting noise durability characteristics ahead.

Such adaptive encoding modulation systems are expected to be additionally employed even in W-CDMA (Wideband-Code Division Multiple Access) which is attracting attention as a third generation mobile communications system.

In adaptive encoding modulation systems, adaptive modulation and code rate between a base station and a terminal is realized through the basic procedures below.

1. The terminal measures the reception quality of a signal transmitted from the base station.
2. The terminal returns to the base station a reception quality message that indicates the measured result of the reception quality.
3. The base station determines the optimal modulation system and code rate from the reception quality message transmitted from the terminal, and transmits to the terminal a transmission parameter that indicates the determined modulation system and code rate.
4. The base station transmits user data based on the transmission parameter.
5. The terminal receives the transmission parameter and carries out a data receiving process based on the transmission parameter.
6. 1~5 mentioned above are repeated periodically.

An outline illustrating this procedure is shown in FIG. 1. In FIG. 1, the relationship between a downlink control channel for notifying the transmission parameter from the base station to the terminal, a downlink data channel for transmitting the user data from the base station to the terminal and an uplink control channel for transmitting the reception quality message from the terminal is shown. In the present figure, an example in which the steps 1~5 mentioned above are carried out at predetermined frame periods is shown.

That is, in FIG. 1, the terminal measures the present reception quality at the terminal and transmits a reception quality message indicating the reception quality to the base station through the uplink control channel.

The base station determines, from the reception quality message transmitted from the terminal, a combination of modulation method and code rate with which, for example, the error rate of the received data at the terminal is at or below a predetermined value, and transmits, as a transmission parameter, information that indicates the modulation method and the code rate to the terminal through the downlink control channel. Moreover, the base station transmits user data to the terminal through the downlink data channel in accordance with the code rate and the modulation method corresponding to the transmission parameter transmitted to the terminal.

Then, the terminal receives the transmission parameter transmitted from the base station in advance and thereby recognizes the code rate, the modulation method and the like of the data transmitted from the base station thereafter. Moreover, the terminal receives the user data transmitted from the base station thereafter, and carries out demodulation by a demodulation method corresponding to the modulation method indicated by the transmission parameter received in advance, and carries out decoding based on a decoding method corresponding to the code rate.

The words "downlink" and "uplink" in the downlink data channel, the downlink control channel and the uplink control channel in FIG. 1 are used for channels for signals transmitted to the terminal from the base station and for channels for signals transmitted to the base station from the terminal, respectively. That is, the word "downlink" is used in the names for channels for signals transmitted to the terminal from the base station. Also, the word "uplink" is used in the names for channels for signals transmitted to the base station from the terminal.

Also, the transmission parameter comprises various parameters which are necessary for the transmission of data from the base station to the terminal.

FIG. 2 shows an example of a configuration of a conventional base station that realizes a communications system using adaptive modulation and code rate (adaptive encoding modulation method).

The base station comprises a transmission/reception compatible device 1, an inverse spreading section 2, a power control bit extracting section 3, a control data inserting section 4, a reception quality message extracting section 5, a mode judging section 6, a control section 7, a control data generating section 8, an encoding modulation section 9, a power adjusting section 10, a spreading section 11, an adaptive encoding modulation section 13 and an antenna 14.

The base station demodulates the transmission signal from the user, at the transmission/reception compatible device 1 and the inverse spreading section 2.

That is, a spread spectrum transmission signal is transmitted to the base station from, for example, a terminal as a mobile station capable of radio communications comprising a portable telephone, other PDAs (Personal Digital Assistant) or the like. This transmission signal is received by the antenna 14 and is supplied to the transmission/reception compatible device 1. The transmission/reception compatible device 1 receives the transmission signal from the antenna 14, performs necessary processing and supplies it to the inverse spreading section 2. The inverse spreading section 2 performs an inverse spread spectrum on the signal supplied from the transmission/reception compatible device 1 and supplies it to the power control bit extracting section 3.

The power control bit extracting section 3 extracts a power control bit from the signal supplied from the inverse spreading section 2. In other words, there is included in the transmission signal transmitted to the base station from the terminal a power control bit, which is a one-bit flag that requests an increase or a decrease in the transmission power of the downlink control channel explained in FIG. 1. The power control bit extracting section 3 extracts such a power control bit from the signal supplied from the inverse spreading section 2 and transfers it to the power adjusting section 10.

The power control bit extracting section 3 extracts the power control bit from the signal supplied from the inverse spreading section 2, while at the same time supplying the signal to the reception quality message extracting section 5. The reception quality message extracting section 5 obtains a reception quality message from the signal supplied from the power control bit extracting section 3.

That is, there is included in the transmission signal transmitted to the base station from the terminal a reception quality message that indicates the reception quality (SIR (Signal to Interference Ratio)) at the terminal, as explained in FIG. 1. The reception quality message extracting section 5 obtains, through extraction, the reception quality message from the signal sent from the power control bit extracting section 3, and transfers it to the mode judging section 6.

Here, the signal that is exchanged between the terminal and the base station is composed in frames of a predetermined duration. Moreover, a frame is configured such that, for example, a slot in units of 0.667 msec (milliseconds) is arranged in a plurality of slots. The power control bit mentioned above is such that it is transmitted from the terminal to the base station per slot. Thus, the power control bit extracting section 3 extracts the power control bit for each slot. Also, at the terminal, the reception quality message is such that it is transmitted in units of one frame. Hence, the reception quality message extracting section 5 extracts the reception quality message in units of one frame.

The mode judging section 6 determines the optimal modulation method and code rate from the reception quality message and the condition of the resources the base station has, and assigns encoding resources and power resources to the user (the terminal).

That is, if the combination of modulation method and code rate is now taken to be a transmission mode, the mode judging section 6 determines the transmission mode from the resources of the base station and the reception quality message supplied from the reception quality message extracting section 5, and supplies it to the control section 7.

Here, a large number of transmission modes can be provided through combinations of code rates and modulation methods. However, here, in order to simplify the explanation, three transmission modes #0 to #2 shown in FIG. 3 are explained.

In FIG. 3, R=½ and R=¾ are provided for the code rate (the encoding method). The code rate R=½ signifies that one redundant bit is added for each input data of one bit. The code rate R=¾ signifies that one redundant bit is added for each input data of three bits. In the code rate R=½, although the error correction performance is stronger to the extent that there are more redundant bits in relation to the input data, the number of transmittable data becomes smaller. On the other hand, in the code rate R=¾, although the error correction performance is inferior to the code rate R=½ since the number of redundant bits in relation to the input data is smaller, the number of transmittable data can be increased.

Also, in FIG. 3, QPSK (Quadrature Phase Shift Keying) and 16 QAM (Quadrature Amplitude Modulation) are provided for the modulation methods. As shown in FIGS. 4A and 4B, in QPSK modulation, two bits of encoded data are mapped to one symbol among four symbols (FIG. 4A), and in 16 QAM, four bits of data are mapped to one symbol among sixteen symbols (FIG. 4B). If a transmittable symbol rate is assumed to be constant, data that is actually transmittable is greater for 16 QAM than it is for QPSK. However, in 16 QAM because the distance between the symbols becomes shorter as compared to QPSK, it has a feature that noise characteristics become worse.

In FIG. 3, the combination of R=½ and QPSK, the combination of R=½ and 16 QAM and the combination of R=¾ and 16 QAM are defined as the transmission modes #0, #1 and #2, respectively. Thus, the relationship in terms of data transfer amount would be transmission mode #0 (R=½, QPSK)<transmission mode #1 (R=½, 16 QAM)<transmission mode #2 (R=¾, 16 QAM). On the other hand, the relationship in terms of noise durability characteristics would be transmission mode #0 (R=½, QPSK)>transmission mode #1 (R=½, 16 QAM)>transmission mode #2 (R=¾, 16 QAM).

According to the adaptive encoding modulation method, if the noise is small and the propagation path is good (in a case where the reception quality at the terminal is good), by selecting a combination (a transmission mode) of modulation method and code rate whose data transfer amount is large, it is possible to carry out efficient data transmission. Also, if the noise is large and the propagation path is poor (in a case where the reception quality at the terminal is poor), by selecting a combination of modulation method and code rate whose noise durability characteristics are high, it is possible to suppress data transfer amount and enhance error characteristics.

The mode judging section 6 selects, for example as shown in FIG. 5, a transmission mode in which the error rate of the user data received by the terminal is at or below a predetermined value.

In other words, FIG. 5 shows the relation between the reception quality (SIR) and the error rate of the user data (FER; Frame Error Rate), for each of the three transmission modes #0 (R=½, QPSK), #1 (R=½, 16 QAM) and #3 (R=¾, 16 QAM) mentioned above. The mode judging section 6 judges and selects, for example, a transmission mode in which the error rate of the user data (FER) is 10% or below in relation to reception quality. In this case, the transmission modes #0 (R=½, QPSK), #1 (R=½, 16 QAM) and #2 (R=¾, 16 QAM) are selected respectively at the mode judging section 6 when the reception quality is −8 dB or lower, higher than −8 dB and lower than −4 dB, and −4 dB or higher.

Returning to FIG. 2, the control section 7 transfers the transmission mode determined by the mode judging section 6 to the control data generating section 8 and the adaptive encoding modulation section 13.

The control data generating section 8 generates control data including the transmission mode supplied from the control section 7, and supplies it to the control data inserting section 4.

The control data inserting section 4 is such that besides having the control data from the control data generating section 8 supplied thereto, audio data transferred from a different base station, NW (NetWork) control data used to judge and control a hand-off for shifting control of the terminal from one base station to another base station and the like are sent thereto. The control data inserting section 4 inserts the control data supplied from the control data generating section 8 into the audio data and the NW control data supplied thereto, and supplies it to the encoding modulation section 9.

The encoding modulation section 9 performs an encoding modulation process on the signal supplied from the control data inserting section 4 through a predetermined method, and sends the modulation signal obtained as a result to the power adjusting section 10.

At the power adjusting section 10, the transmission power of the data through the downlink control channel explained in FIG. 1 is determined in accordance with the power control bit supplied from the power control bit extracting section 3. In other words, the power control bit is, for example, as mentioned above, a 1-bit flag, and the power adjusting section 10 processes the modulation signal from the encoding modulation section 9 so as to increase the transmission power in the downlink control channel by 1 dB if the power control bit is 1, and decrease the transmission power in the downlink control channel by 1 dB if the power control bit is 0. Thus, a mechanism for transmitting data in the downlink control channel to the terminal at an optimal power is provided. In addition, the signal in this downlink control channel is transmitted in such a form that it is always associated with the downlink data channel explained in FIG. 1.

Here, in the W-CDMA system, the base station carries out such control of the transmission power in the downlink control channel in accordance with the power control bit transmitted from the terminal with each slot.

The modulation signal whose transmission power is adjusted at the power adjusting section 10 is supplied to the spreading section 11.

On the other hand, packet data in which the user data transmitted through the downlink data channel explained in FIG. 1 is placed is supplied to the adaptive encoding modulation section 13. Then, the adaptive encoding modulation section 13 encodes the packet data in accordance with the code rate represented by the transmission mode supplied from the control section 7, and further carries out a modulation process in accordance with the modulation method represented by the transmission mode. The adaptive encoding modulation section 13 supplies to the spreading section 11 the modulation signal thus obtained by encoding and modulating the packet data.

Here, FIG. 6 shows a configuration example of the adaptive encoding modulation section 13 in a case where, as shown in FIG. 3, the three transmission modes #0 to #2 are arranged.

The packet data inputted to the adaptive encoding modulation section 13 is supplied to a switch 21.

Then, if the transmission mode supplied from the control section 7 is transmission mode #0, the switch 21 selects a terminal 21*a*, and a switch 24 selects a terminal 24*a*.

The terminal 21*a* is connected to an encoding section 22*a*. Therefore, if the transmission mode is #0, the packet data is supplied from the switch 21 to the encoding section 22*a*. The encoding section 22*a* encodes the packet data supplied thereto at a code rate of $R=\frac{1}{2}$, thereby adding an error correcting code, and supplying the encoded data obtained as a result thereof to a QPSK modulation section 23*a*. The QPSK modulation section 23*a* performs QPSK modulation on the encoded data from the encoding section 22*a*, thereby carrying out a modulation symbol mapping, and supplies a modulation signal obtained as a result thereof to the terminal 24*a* of the switch 24. If the transmission mode is #0, because the switch 24 has selected the terminal 24*a* as mentioned above, the modulation signal outputted by the QPSK modulation section 23*a* is supplied to the spreading section 11 (FIG. 2) via the switch 24.

In addition, if the transmission mode supplied from the control section 7 is transmission mode #1, the switch 21 selects a terminal 21*b*, and the switch 24 selects a terminal 24*b*. The terminal 21*b* is connected to an encoding section 22*b*. Therefore, if the transmission mode is #1, the packet data is supplied from the switch 21 to the encoding section 22*b*. The encoding section 22*b* encodes the packet data supplied thereto at a code rate of $R=\frac{1}{2}$, and supplies the encoded data obtained as a result thereof to a 16 QAM modulation section 23*b*. The 16 QAM modulation section 23*b* performs 16 QAM modulation on the encoded data from the encoding section 22*b*, and supplies the modulation signal obtained as a result thereof to the terminal 24*b* of the switch 24. If the transmission mode is #1, because the switch 24 has selected the terminal 24*b* as mentioned above, the modulation signal outputted by the 16 QAM modulation section 23*b* is supplied to the spreading section 11 (FIG. 2) via the switch 24.

Moreover, if the transmission mode supplied from the control section 7 is transmission mode #2, the switch 21 selects a terminal 21*c*, and the switch 24 selects a terminal 24*c*. The terminal 21*c* is connected to an encoding section 22*c*. Therefore, if the transmission mode is #2, the packet data is supplied from the switch 21 to the encoding section 22*c*. The encoding section 22*c* encodes the packet data supplied thereto at a code rate of $R=\frac{3}{4}$, and supplies the encoded data obtained as a result thereof to a 16 QAM modulation section 23*c*. The 16 QAM modulation section 23*c* performs 16 QAM modulation on the encoded data from the encoding section 22*c*, and supplies the modulation signal obtained as a result thereof to the terminal 24*c* of the switch 24. If the transmission mode is #2, because the switch 24 has selected the terminal 24*c* as mentioned above, the modulation signal outputted by the 16 QAM modulation section 23*c* is supplied to the spreading section 11 (FIG. 2) via the switch 24.

Again, returning to FIG. 2, using separate spreading codes, the spreading section 11 performs a spread spectrum on the modulation signal supplied from the power adjusting section 10 and the modulation signal supplied from the adaptive encoding modulation section 13, and supplies the thus obtained spread signals to the transmission/reception compatible device 1. The transmission/reception compatible device 1 performs the necessary process on the spread signals from the spreading section 11, and transmits them to the terminal as radio waves from the antenna 14.

Of the signals thus transmitted, the modulation signal supplied from the power adjusting section 10 is the signal in the downlink control channel of FIG. 1, and the modulation signal supplied from the adaptive encoding modulation section 13 is the signal in the downlink data channel of FIG. 1.

In addition, in the downlink data channel, as mentioned above, the user data is transmitted in the form of packet data. As such, the downlink data channel will hereinafter be referred to as a packet channel as deemed appropriate. Also, the downlink control channel is transmitted in such a manner as to be always associated with the downlink data channel (the packet channel) as mentioned above. As such, the downlink control channel will hereinafter be referred to as an associated channel as deemed appropriate.

Here, the packet channel, in which the user data is transmitted and adaptive encoding modulation is performed, is referred to as, for example, HS-DSCH (High Speed Downlink Shared CHannel). Also, the associated channel, in which the audio data, the NW control data and the control data including the transmission mode are transmitted and on which transmission power control through the power control bit is performed, is referred to as, for example, DPCH (Dedicated Physical CHannel).

Next, FIG. 7 shows a configuration example of a conventional terminal which realizes a communications system using adaptive modulation and coding rate (adaptive encoding modulation method).

A terminal (a user terminal) comprises a transmission/reception compatible device 31, an inverse spreading section 32, an associated channel reception quality estimating section 33, a power control bit generating section 34, a packet channel reception quality estimating section 35, a reception quality message generating section 36, an associated channel demodulation decoding section 37, a control section 38, a user data demodulation decoding section 39, an error detecting section 40, a reception quality message inserting section 43, a power control bit inserting section 44, a spreading section 45, and an antenna 47.

A transmission signal sent out from the base station is received by the antenna 47 and supplied to the inverse spreading section 32 after necessary processing is performed by the transmission/reception compatible device 31. The inverse spreading section 32 performs an inverse spread spectrum on the signal from the transmission/reception compatible device 31 to thereby separate it into a packet channel signal and an associated channel signal. Then, the inverse spreading section 32 supplies the associated channel signal to the associated channel reception quality estimating section 33 and the associated channel demodulation decoding section 37. Moreover, the inverse spreading section 32 supplies the packet channel signal to the packet channel reception quality estimating section 35 and the user data demodulation decoding section 39.

The associated channel reception quality estimating section 33 estimates the signal to noise ratio (SNR) from a pilot signal time-multiplexed on the associated channel. In other words, although not explained in FIG. 2, for example, the control data inserting section 4 is such that it time-multiplexes a predetermined pilot signal as the associated channel signal. Thus, that pilot signal is included in the associated channel signal. The associated channel reception quality estimating section 33 estimates the SNR of the associated channel signal supplied from the inverse spreading section 32 using the pilot signal included in the signal, and supplies to the power control bit generating section 34 the estimated SNR as the reception quality of the associated channel.

The power control bit generating section 34 outputs to the power control bit inserting section 44 a power control bit of a value of 0 if the estimated SNR of the associated channel (the reception quality of the associated channel) is better than a reference quality of the associated channel which is the desired SNR, or a power control bit of a value of 1 if it is worse. Here, the estimation of the SNR at the associated channel reception quality estimating section 33 and the generation of the power control bit at the power control bit generating section 34 are executed for each slot. In the base station in FIG. 2, the power adjusting section 10 controls the transmission power of the associated channel based on the power control bit such that the associated channel can be received by the terminal always at a constant SNR.

The associated channel demodulation decoding section 37 demodulates and decodes the associated channel signal supplied from the inverse spreading section 32 and separates the audio data, the NW control data and the control data. The audio data, the W control data and the control data are supplied to a circuit not shown in the drawings and are also supplied to the control section 38.

The control section 38 detects information on the modulation method and the code rate which are placed in the control data supplied from the associated channel demodulation decoding section 37 and applied to the packet channel, namely, the transmission mode, and carries out mode setting (control) of the user data demodulation decoding section 39.

In other words, if the transmission mode is #0, the control section 38 controls the user data demodulation decoding section 39 so as to QPSK demodulate the packet channel signal and further decode it at a code rate of R=½. Also, if the transmission mode is #1, the control section 38 controls the user data demodulation decoding section 39 so as to 16 QAM demodulate the packet channel signal and further decode it at a code rate of R=½. Alternatively, if the transmission mode is #2, the control section 38 controls the user data demodulation decoding section 39 so as to 16 QAM demodulate the packet channel signal and further decode it at a code rate of R=¾.

On the other hand, the packet channel reception quality estimating section 35 estimates the SNR of the packet channel signal supplied from the inverse spreading section 32. A pilot symbol that is time-multiplexed on the packet channel or a pilot channel symbol transmitted in parallel with the packet channel is used in this SNR estimation.

In other words, although not explained in FIG. 2, the spreading section 11 is such that it time-multiplexes the predetermined pilot signal on the modulation signal supplied from the adaptive encoding modulation section 13 and then carries out a spread spectrum. Thus, the packet channel signal includes the pilot signal. Also, the spreading section 11 is such that it performs a spread spectrum on a different pilot signal with a spreading code different from the spreading code used in the spread spectrum of the modulation signal supplied from the power adjusting section 10 or the adaptive encoding modulation section 13, and transmits it via the transmission/reception compatible device 1 and the antenna 14 in parallel with the packet channel or the associated channel.

The packet channel reception quality estimating section 35 estimates the SNR of the packet channel signal supplied from the inverse spreading section 32 using the pilot signal included in that signal or the pilot signal that is transmitted in parallel with the packet channel signal, and supplies to the reception quality message generating section 36 the estimated SNR as the reception quality of the packet channel.

The reception quality message generating section 36 generates a reception quality message of a predetermined message format representing the estimated SNR of the packet channel (the reception quality of the packet channel) supplied from the packet channel reception quality estimating section 35, and supplies it to the reception quality message inserting section 43.

Here, the estimation of the SNR of the packet channel by the packet channel reception quality estimating section 35 and the generation of the reception quality message by the reception quality message generating section 36 are executed for each frame.

On the other hand, the user data demodulation decoding section 39 decodes and demodulates the packet channel signal supplied from the inverse spreading section 32 in accordance with the control of the control section 38, and supplies the packet data obtained as a result thereof to the error detecting section 40. In addition, the user data demodulation decoding section 39, upon decoding the packet channel signal, carries out error correction of the packet data using the error correcting code included in that signal as a redundant bit.

The error detecting section 40 carries out, for example, parity detection using cyclic redundancy check (CRC) and judges whether or not there is an error in the packet data decoded by the user data demodulation decoding section 39. Then, the error detecting section 40 outputs ACK (ACKnowledge), which is a message indicating that the packet data was received properly, if there is no error in the packet data, and outputs NACK, which is a message indicating that the packet data could not be received properly, if there is an error in the packet data.

In addition, although not shown in FIG. 7 (which similarly applies to FIG. 20 described later), the ACK/NACK outputted by the error detecting section 40 is supplied to the spreading section 45 and is transmitted to the base station.

The reception quality message inserting section 43 frames the reception quality message, which is supplied from the reception quality message generating section 36, in the uplink control channel signal explained in FIG. 1, and supplies it to the power control bit inserting section 44. The power control bit inserting section 44 frames the power control bit, which is supplied from the power control bit generating section 34, in the uplink control channel signal supplied from the reception quality message inserting section 43, and supplies it to the spreading section 45. The spreading section 45 performs a spread spectrum on the uplink control channel signal from the power control bit inserting section 44 and supplies the spread signal obtained as a result thereof to the transmission/reception compatible device 31. The transmission/reception compatible device 31 performs necessary processing on the spread signal from the spreading section 45 and transmits it from the antenna 47 as a radio wave.

In addition, at the terminal, the reception quality message is transmitted per frame, and the power control bit is transmitted per slot.

According to the adaptive encoding modulation method, the data transmission speed can be changed in accordance with the reception condition (the reception quality) of the terminal, and data can be transmitted to the terminal side more efficiently.

By the way, in the adaptive encoding modulation method, for example, the terminal, which is the mobile station, reports the estimated result of the reception quality of the packet channel to the base station, and the base station selects the optimal combination of the modulation method and encoding method based on the reported value (the reception quality indicated by the reception quality message). For this reason, the reception quality accuracy reported to the base station becomes important.

However, because there arises a delay in the estimation and reporting of the reception quality of the packet channel and the message reception at the base station, there are instances where there is some difference between the actual reception quality of the packet channel at the terminal at the time when the base station has demodulated the reception quality message and the reception quality represented by the reception quality message.

In other words, at the terminal, as mentioned above, the reception quality of the packet channel is estimated in periods of frames and is transmitted to the base station. For this reason, from when the reception quality at the terminal is estimated till when that reception quality is recognized at the base station, there is a time lag corresponding to several frames. The reception quality recognized by the base station is a reception quality that is behind by a period of time represented by the time lag. Therefore, there are cases where the reception quality recognized by the base station differs from the current reception quality at the terminal. In such cases, the base station cannot select the optimal combination of the modulation and the encoding methods, which may lower system efficiency.

This phenomenon presents itself most notably when reception propagation path characteristics change rapidly, such as when, in particular, the terminal, which is the mobile station, is moving at high speed.

As such, a method may be considered in which the reception quality message representing the reception quality of the packet channel is transmitted more frequently from the terminal to the base station. However, if the transmission frequency of the reception quality message is made higher, the usage of radio resources increases, and further, power consumption at the terminal also increases.

Therefore, in order to save radio resources and carry out a more effective system operation, it is effective to slow (extend) the reception quality report period. However, by slowing the period, the delay from the time of estimation of the reception quality to when the reported value (the reception quality message) reaches the base station further increases, which results in a larger difference between the reported value and the actual reception quality.

DISCLOSURE OF THE INVENTION

The present invention is proposed in view of such circumstances, and is one which makes it possible to achieve an improvement in system efficiency, in other words a reduction in power consumption by the terminal, conservation of radio resources and the like, by accurately predicting the reception quality of a packet channel for data communications from, for example, the transmission power of an associated channel for audio and the like.

A transmission apparatus of the present invention is characterized in that it comprises training means for carrying out training to obtain correlation information that correlates the reception quality of a first channel transmitted from a reception apparatus for receiving data and a transmission power of a second channel, predicting means for obtaining a predicted value of the reception quality of the first channel based on the correlation information and using the transmission power of the second channel, and transmission control means for controlling the transmission of the data through the first channel based on the predicted value of the reception quality of the first channel.

A transmission control method of the present invention is characterized in that it comprises a training step for carrying out training to obtain correlation information that correlates a reception quality of a first channel transmitted from a reception apparatus for receiving data and a transmission power of a second channel, a predicting step for calculating a predicted value of the reception quality of the first channel based on the correlation information and using the transmission power of the second channel, and a transmission controlling step for controlling the transmission of data through the first channel based on the predicted value of the reception quality of the first channel.

A first program of the present invention is characterized in that it comprises a training step for carrying out training to obtain correlation information that correlates a reception quality of a first channel transmitted from a reception apparatus for receiving data and a transmission power of a second channel, a predicting step for obtaining a predicted value of the reception quality of the first channel based on the correlation information and using the transmission power of the second channel, and a transmission controlling step for controlling the transmission of data through the first channel based on the predicted value of the reception quality of the first channel.

A reception apparatus of the present invention is characterized in that it comprises extracting means for extracting transmission control information for controlling the transmission of the reception quality of a first channel from data of a second channel transmitted from a transmission apparatus, and transmission controlling means for controlling the transmission of the reception quality of the first channel based on the transmission control information.

A reception control method of the present invention is characterized in that it comprises an extracting step for extracting transmission control information for controlling the transmission of the reception quality of a first channel from data of a second channel transmitted from a transmission apparatus, and a transmission controlling step for controlling the transmission of the reception quality of the first channel based on the transmission control information.

A second program of the present invention is characterized in that it comprises an extracting step for extracting transmission control information for controlling the transmission of the reception quality of a first channel from data of a second channel transmitted from a transmission apparatus, and a transmission controlling step for controlling the transmission of the reception quality of the first channel based on the transmission control information.

A communications system of the present invention is characterized in that a transmission apparatus has training means for carrying out training to obtain correlation information that correlates the reception quality of a first channel transmitted from a reception apparatus and the transmission power of a second channel, prediction means for obtaining a predicted value of the reception quality of the first channel based on the correlation information and using the transmission power of the second channel, data transmission controlling means for controlling the transmission of data through the first channel based on the predicted value of the reception quality of the first channel, and transmission control information transmitting means for transmitting to the reception apparatus transmission control information for controlling the transmission of the reception quality of the first channel by the reception apparatus through the second channel, and in that the reception apparatus has extracting means for extracting the transmission control information from the data of the second channel transmitted from the transmission apparatus and reception quality transmission controlling means for controlling the transmission of the reception quality of the first channel based on the transmission control information.

In the transmission apparatus, the transmission control method and the first program of the present invention, the training for obtaining the correlation information that correlates the reception quality of the first channel transmitted from the reception apparatus for receiving data and the transmission power of the second channel is performed. Based on the correlation information, the transmission power of the second channel is used to thereby calculate the predicted value of the reception quality of the first channel. Then, the transmission of data through the first channel is controlled based on the predicted value of the reception quality of that first channel.

In the reception apparatus, the reception control method and the second program of the present invention, the transmission control information that controls the transmission of the reception quality of the first channel is extracted from the data of the second channel transmitted from the transmission apparatus. The transmission of the reception quality of the first channel is controlled based on the transmission control information.

In the communications system of the present invention, the training for obtaining the correlation information that correlates the reception quality of the first channel transmitted from the reception apparatus and the transmission power of the second channel is performed, and based on the correlation information, the predicted value of the reception quality of the first channel is calculated at the transmission apparatus using the transmission power of the second channel. Then, the transmission of data through the first channel is controlled based on the predicted value of the reception quality of the first channel, while on the other hand, the transmission control information that controls the transmission of the reception quality of the first channel by the reception apparatus is transmitted through the second channel to the reception apparatus. In the reception apparatus, the transmission control information is extracted from the data of the second channel transmitted from the transmission apparatus. The transmission of the reception quality of the first channel is controlled based on the transmission control information.

BRIEF DESCRIPTION OF DRAWINGS

FIG. 3 is a view explaining transmission modes;

FIG. 4A is a view showing the mapping of data by a QPSK modulation method;

FIG. 4B is a view showing the mapping of data by a 16 QAM modulation method;

FIG. 15 is a view showing the transmission power of the associated channel and the reception quality of the packet channel;

FIG. 23 is a flowchart explaining a process at the terminal 102; and

FIG. 24 is a block diagram showing a configuration example of an embodiment of a computer to which the present invention is applied.

BEST MODE FOR CARRYING OUT THE INVENTION

Figure 8:
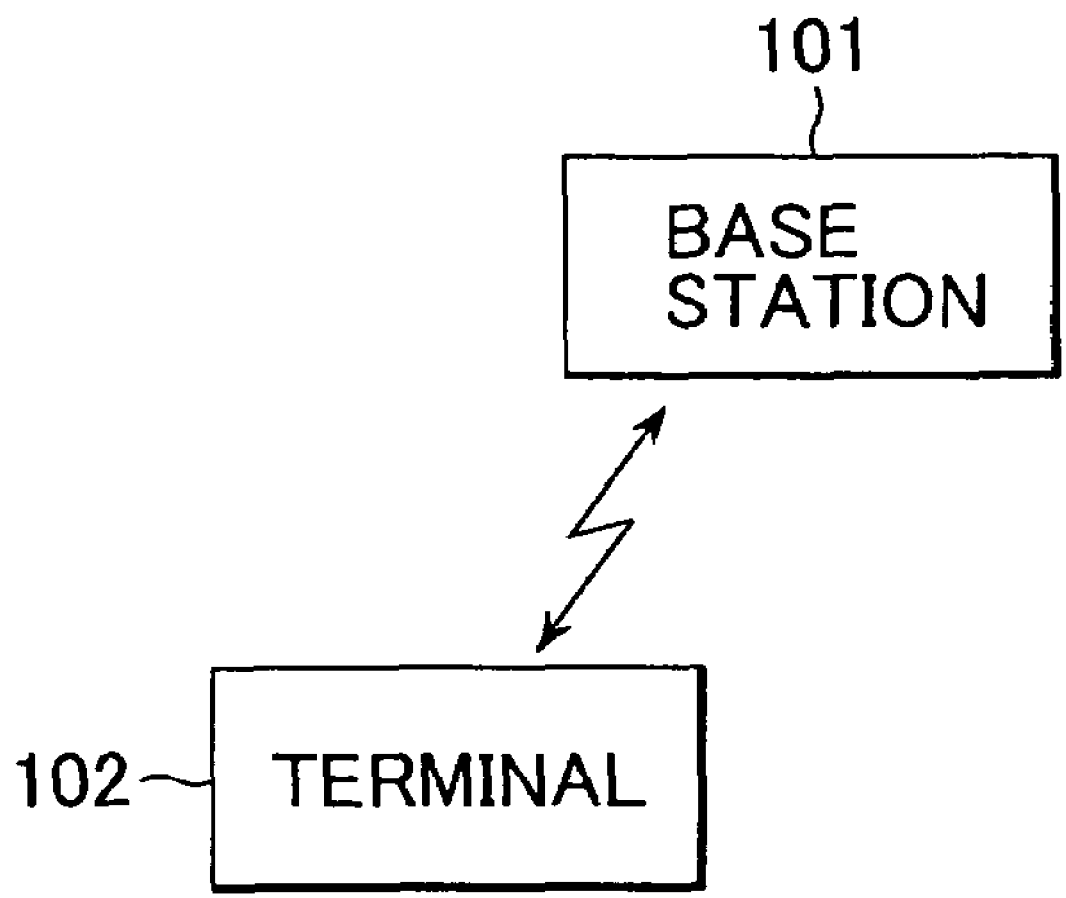
FIG. 8 is a block diagram showing a configuration example of an embodiment of a communications system to which the present invention is applied.

FIG. 8 shows a configuration example of an embodiment of a communications system to which the present invention is applied (a system refers to something in which a plurality of apparatuses are logically aggregated, regardless of whether or not each constituent apparatus exists in a single body).

The communications system in FIG. 8 comprises a base station 101 and a terminal 102, for example, such as a portable telephone or the like. The communication system is such that data is exchanged between the base station 101 and the terminal 102 through radio communications.

In addition, in the embodiment of FIG. 8, one each of the base station 101 and the terminal 102 is illustrated. However, the communications system may comprise a plurality of base stations and terminals.

Figure 9:
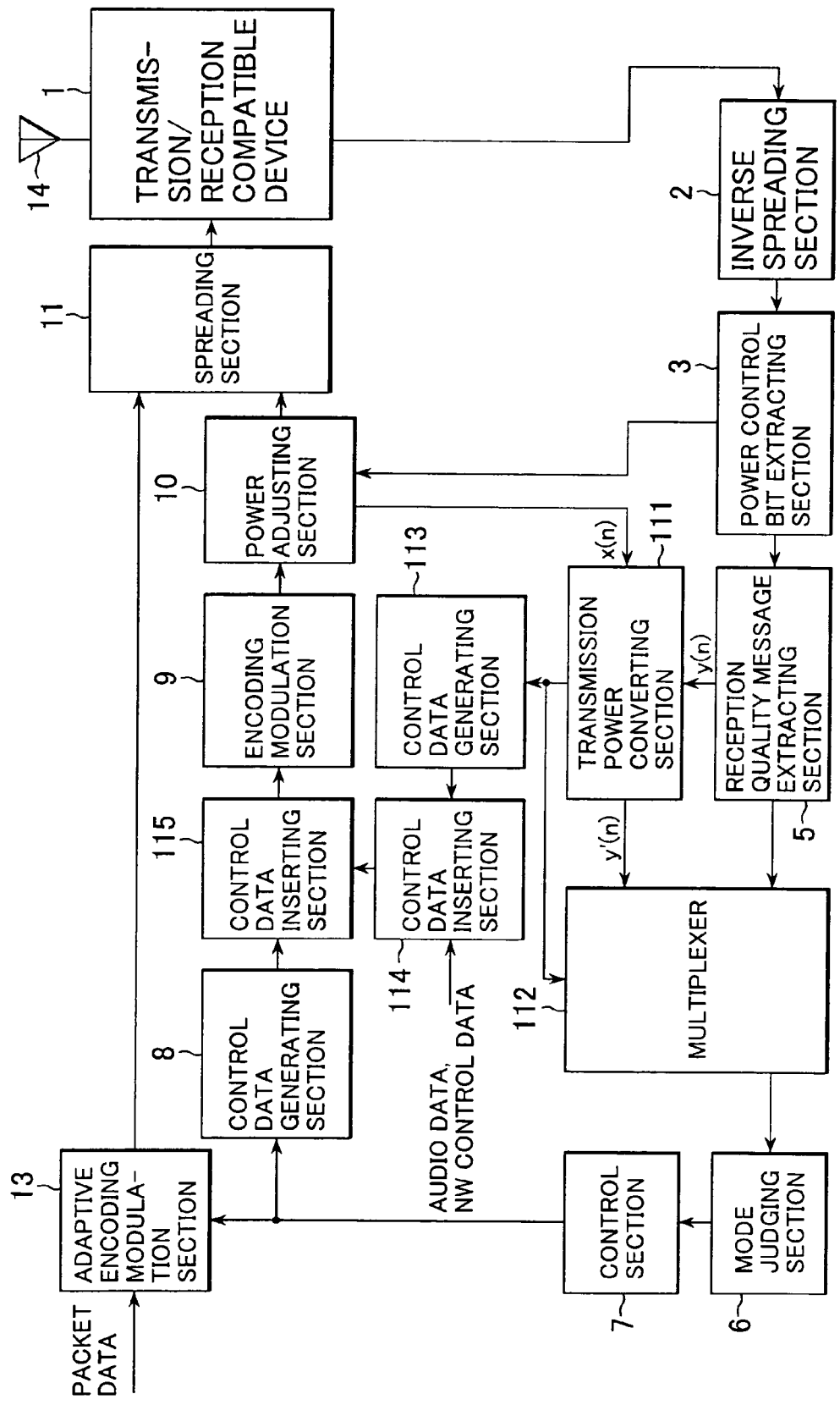
FIG. 9 is a block diagram showing a configuration example of a base station 101.

FIG. 9 shows a configuration example of the base station 101 of FIG. 8. In addition, the same symbols are given to the portions corresponding to the case in FIG. 2, and hereinafter explanations thereof are omitted as deemed appropriate.

In FIG. 9, the base station 101 comprises a transmission/reception compatible device 1, an inverse spreading section 2, a power control bit extracting section 3, a reception quality message extracting section 5, a mode judging section 6, a control section 7, an encoding modulation section 9, a power adjusting section 10, a spreading section 11, an adaptive encoding modulation section 13, a transmission power converting section 111, a multiplexer 112, a control data generating section 113 and control data inserting sections 114 and 115.

Figure 2:
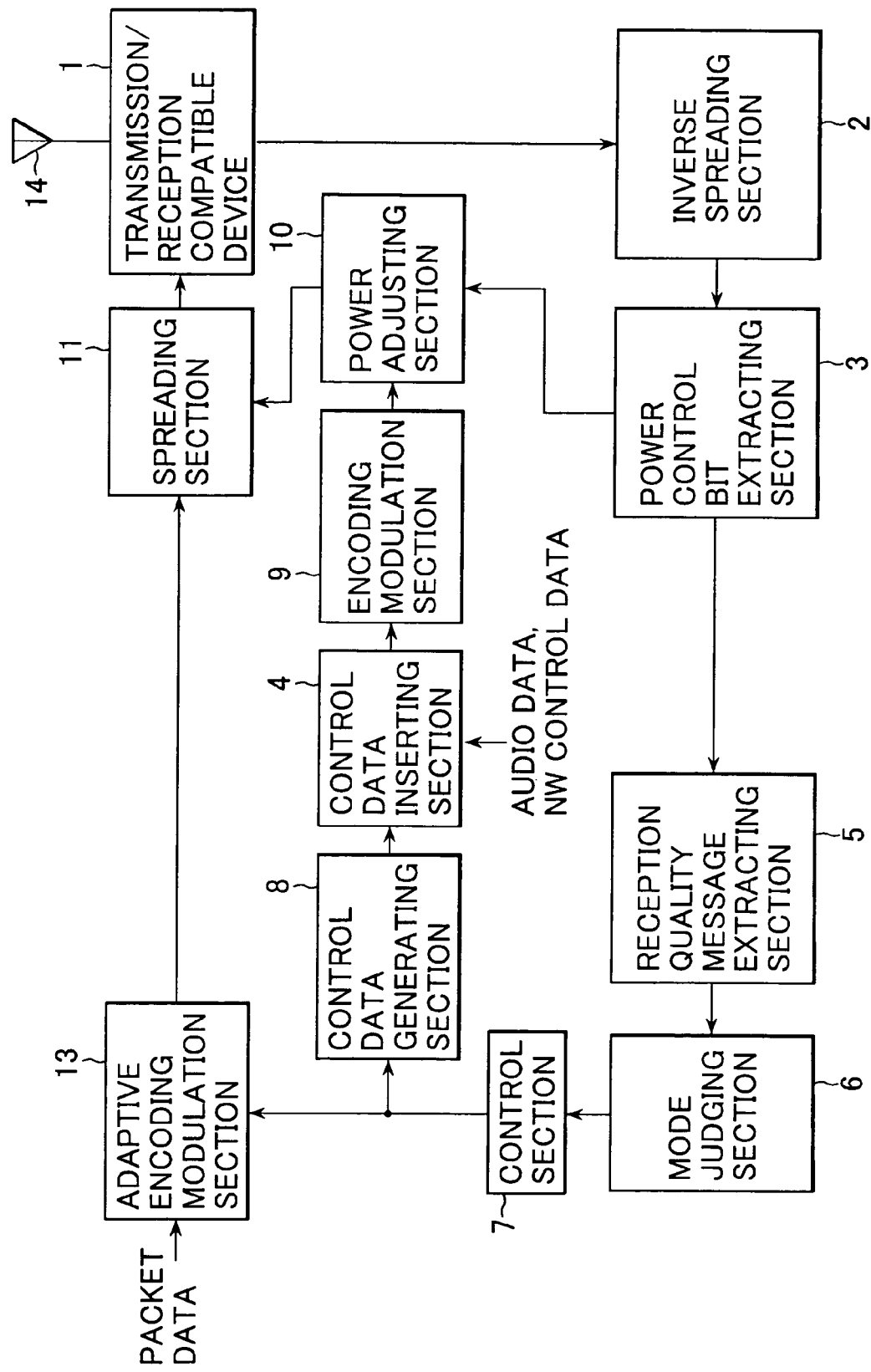
FIG. 2 is a view showing a configuration of an example of a conventional base station.
Figure 5:
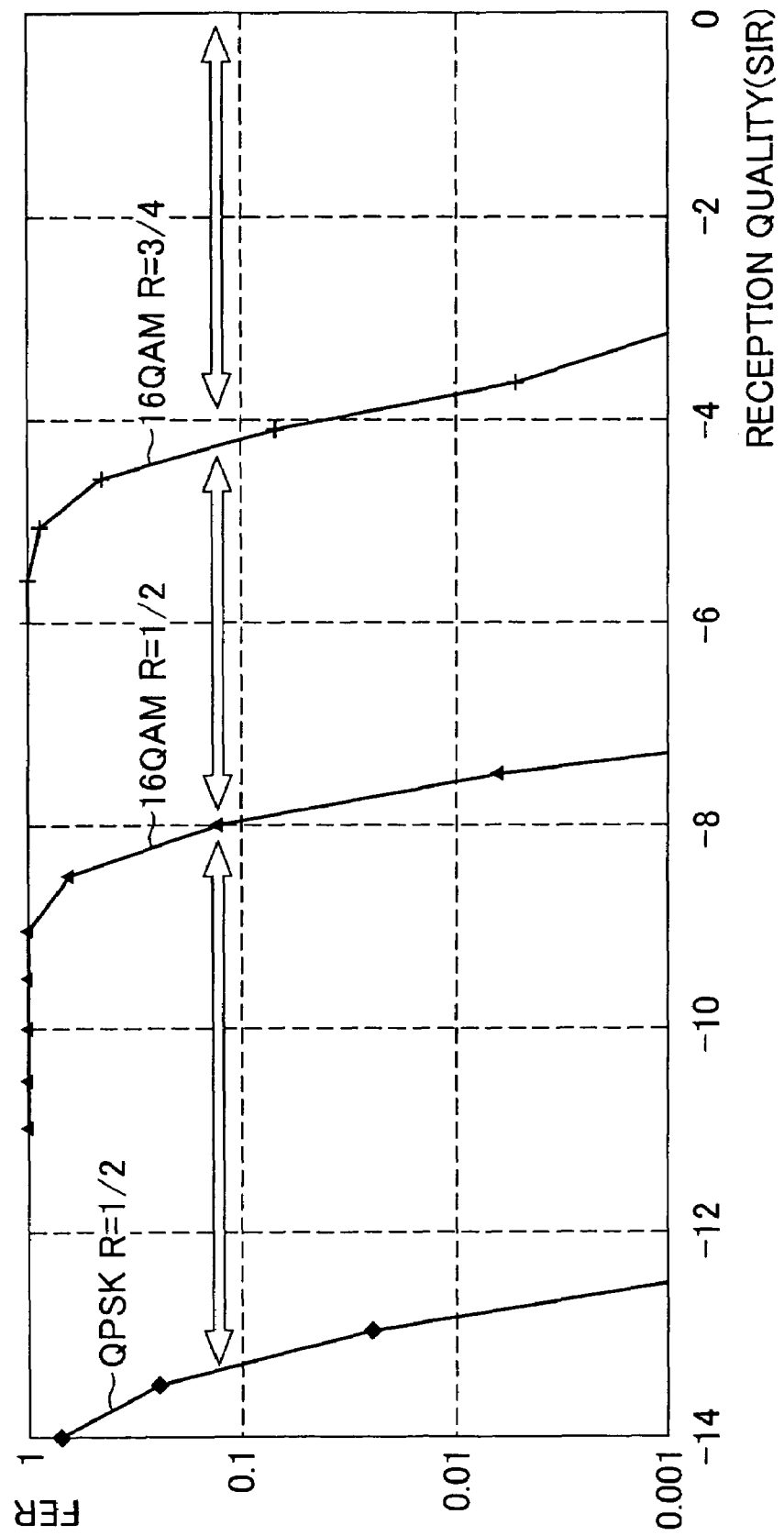
FIG. 5 is a view showing the relationship between reception quality and error rate.
Figure 6:
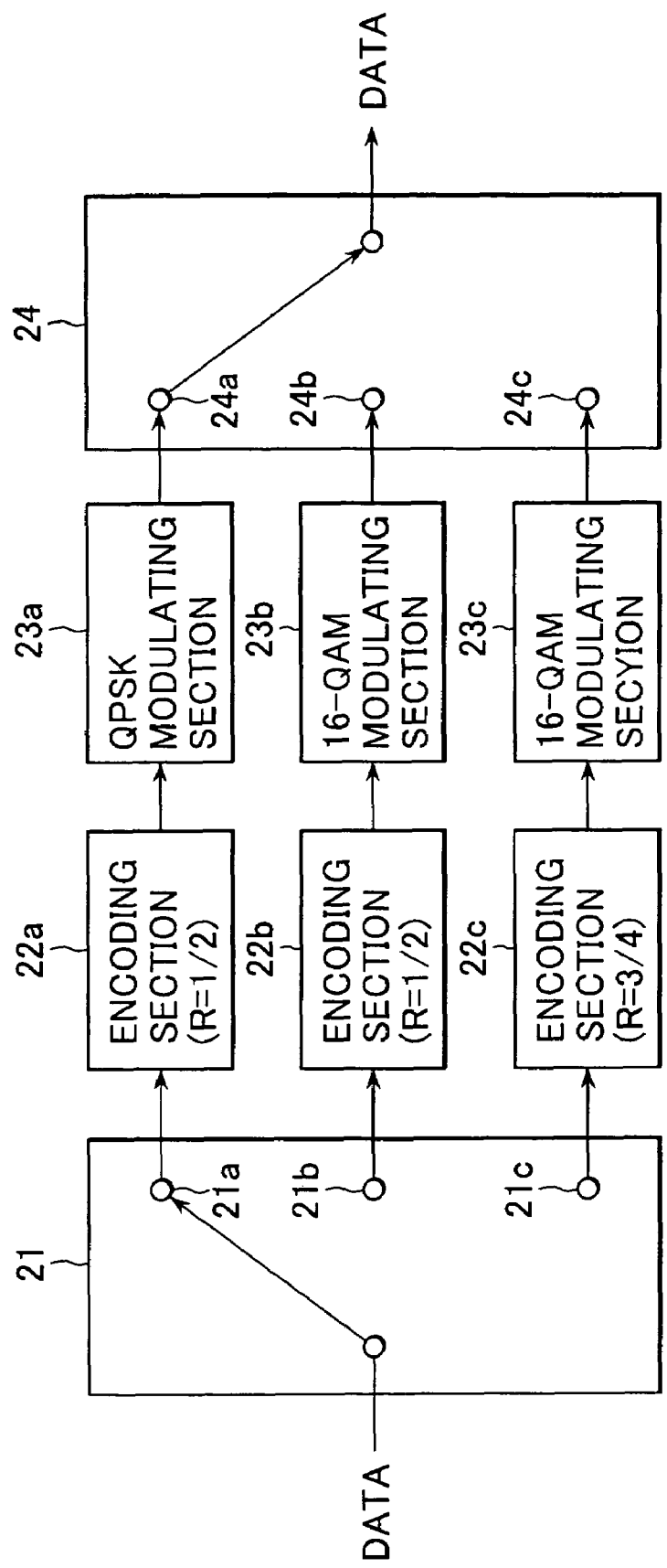
FIG. 6 is a block diagram showing a configuration example of an adaptive encoding modulation section 13.

Thus, the base station 101 of FIG. 9 is basically designed similar to the base station of FIG. 2 except in that the transmission power converting section 111, the multiplexer 112 and the control data generating section 113 are newly provided and in that the control data inserting sections 114 and 115 are provided in place of the control data inserting section 4.

To the transmission power converting section 111 are supplied a reception quality message from the reception quality message extracting section as well as transmission power (absolute transmission power) of an associated channel from the power adjusting section 10. The transmission power converting section 111 carries out training to obtain a parameter as correlation information that correlates reception quality y[n] of a packet channel represented by the reception quality message supplied from the reception quality message extracting section 5 and transmission power x[n] of the associated channel supplied from the power adjusting section 10.

Here, with the reception quality represented by a reception quality message extracted by the reception quality message extracting section 5 as a reference, the reception quality y[n] of the packet channel signifies the reception quality represented by the n+1h reception quality message extracted from the reception quality message that serves as the reference. Also, the transmission power x[n] of the associated channel signifies the transmission power of the associated channel when the reception quality y[n] of the packet channel is obtained.

Once the parameter that correlates the reception quality y[n] and the transmission power x[n] is obtained through the training, based on that parameter, the transmission power converter 111 obtains a predicted value y'[n] of the reception quality of the packet channel using the transmission power of the associated channel supplied from the power adjusting section 10, and supplies it to the multiplexer 112.

Moreover, the transmission power converting section 111 controls the multiplexer 112 and the control data generating section 113.

In addition to having the predicted value y'[n] of the reception quality supplied from the transmission power converting section 111, the reception quality message is supplied from the reception quality message extracting section 5 to the multiplexer 112. Then, in accordance with the control of the transmission power converting section 111, the multiplexer 112 selects either one of the predicted value y'[n] of the reception quality supplied from the transmission power converting section 111 and the reception quality message supplied from the reception quality message extracting section 5, and supplies it to the mode judging section 6.

Thus, in the base station 101 of FIG. 9, the mode judging section 6 determines the transmission mode based on either the predicted value y'[n] of the reception quality or the reception quality represented by the reception quality message. The control section 7 controls the code rate and the modulation method of the packet data in the adaptive encoding modulation section 13 based on that transmission mode.

In other words, in the embodiment of FIG. 9, the code rate and the modulation method of the packet data are controlled on the basis of the reception quality represented by the reception quality message transmitted from the terminal 102 and the predicted value of the reception quality obtained by the transmission power converting section 111.

The control data generating section 113, in accordance with the control of the transmission power converting section 111, generates control data as transmission control information for controlling the transmission of the reception quality message by the terminal 102, and supplies it to the control data inserting section 114.

Here, the transmission control information is start/stop information that instructs the starting or stopping of transmission of the reception quality message by the terminal 102, or is transmission frequency information which instructs the transmission frequency of the reception quality message by the terminal 102. However, for example, now, if it is assumed that the transmission frequency information indicates a transmission period for the reception quality message, when the transmission period is a finite value, the reception quality message is transmitted, but if the transmission period is infinite, the reception quality message is not transmitted. Thus, it can be said that the transmission frequency information is information which encompasses the start/stop information.

Other than the transmission control information as the control data supplied from the control data generating section 113, to the control data inserting section 114 are supplied audio data transferred from other base stations, NW control data used to judge and control a hand-off for transferring the control of the terminal 102 from the base station 101 to another base station or from another base station to the base station 101, and the like. The control data inserting section 114 inserts into the audio data and the NW control data sent thereto the control data supplied from the control data generating section 113, and supplies it to the control data inserting section 115.

In addition to output data from the control data inserting section 114, the transmission mode as control data outputted by the control data generating section 8 is also supplied to the control data inserting section 115. Then, the control data inserting section 115 inserts the control data supplied from the control data generating section 8 into the data from the control data inserting section 114, and outputs it.

The data that the control data inserting section 115 outputs is supplied to the encoding modulation section 9, and thereafter is transmitted as an associated channel signal as in the case of FIG. 2 mentioned above. Thus, the transmission control information as the control data generated by the control data generating section 113 is transmitted to the terminal 102 as the associated channel signal.

In the base station 101 thus configured, for example, the following process is carried out.

1. Transmission and reception of data at the base station 101 are executed in accordance with a training mode and a normal mode. Here, the training mode is an operation mode for obtaining (learning) a parameter to reduce prediction errors in the predicted value of the reception quality of the packet channel obtained at the base station 101. In the present embodiment, although it is supposed to be such that, for example, the training mode is entered each time it enters a call, it is not limited as such, and the process of the training mode may be performed periodically to obtain the parameter for reducing prediction errors. Also, the process of the training mode may be performed only once if the possibility of entering a situation in which prediction errors increase is slim. Also, the normal mode refers to a normal communication state after the training is finished (the state in which the predicted value of the reception quality of the packet channel is obtained on the basis of the parameter obtained in the training mode, and the transmission mode is determined on the basis of the predicted value).

2. The multiplexer 112 is controlled so as to select the output from the reception quality message extracting section 5 during training mode or the output from the transmission power converting section 111 during normal mode. This selection control is performed based on a flag (information) indicating whether the current operation mode inputted to the multiplexer 112 from the transmission power converting section 111 is the training mode or the normal mode. This flag is also inputted to the control data generating section 113 from the transmission power converting section 111. Based on the flag from the transmission power converting section 111, the control data generating section 113 generates the transmission control information as the control data, and transmits it to the terminal 102 via the control data inserting sections 114, 115, the encoding modulation section 9, the power adjusting section 10, the spreading section 11, the transmission/reception compatible device 1 and the antenna 14. Thus, the transmission control information together with the audio data and the NW control data which are supplied to the control data inserting section 114, as well as the transmission mode as the control data supplied to the control data inserting section 115 from the control data generating section 8 are transmitted to the terminal 102.

3. During training mode, the transmission power converting section 111 receives the absolute transmission power value x[n] of the associated channel from the power adjusting section 10, and the packet channel reception quality value y[n] from the reception quality message extracting section 5. Here, in FIG. 15 which will be described later, there are shown examples of the absolute transmission power value x[n] of the associated channel and the packet channel reception quality value y[n]. The absolute transmission power x[n] of the associated channel is dependent upon an associated channel reference quality (a value requested by the terminal 102 as the reception quality of the associated channel) set on the terminal 102 side. When the propagation characteristics of a radio propagation path are represented by H[t], x[n] assumes inverse characteristics to H[t], as explained in FIG. 13A, FIG. 13B and FIG. 13C as well as FIG. 14A, FIG. 14B and FIG. 14C which will be described later. In addition, the associated channel reference quality on the terminal 102 side is different for each call. If the associated channel reference quality increases by an amount corresponding to k [dB], the absolute transmission power x[n] of the associated channel in the base station 101 also increases relatively by an amount corresponding to k [dB].

Figure 14A:
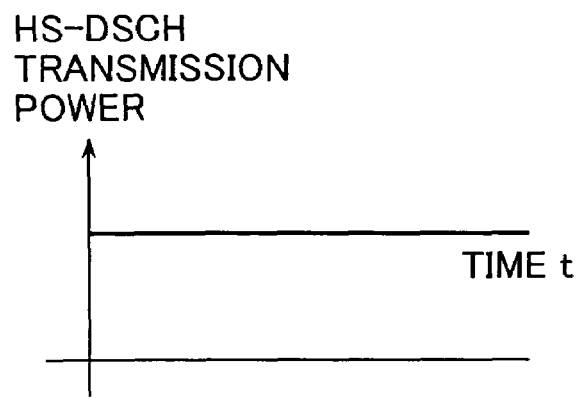
FIG. 14A is a view showing the transmission power of a packet channel.
Figure 14B:
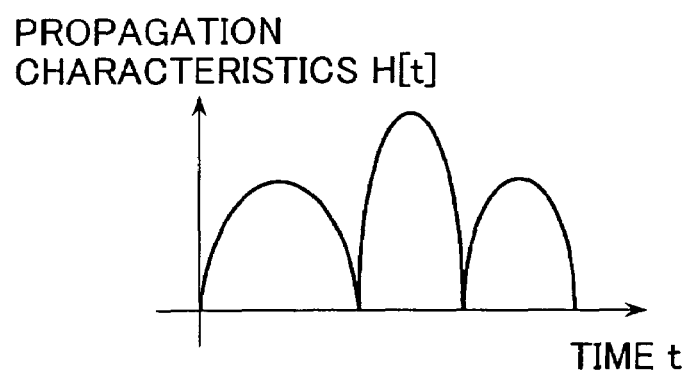
FIG. 14B is a view showing propagation characteristics.
Figure 14C:
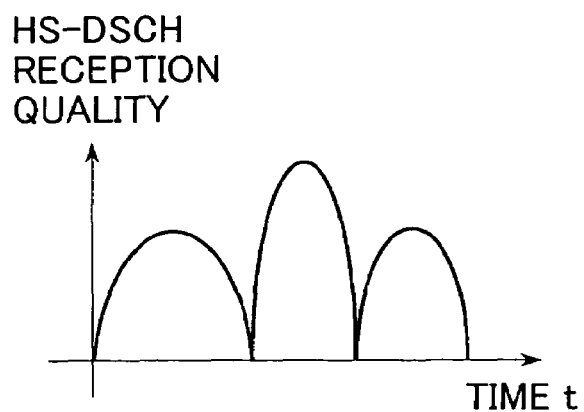
FIG. 14C is a view showing the reception quality of the packet channel.

4. The transmission power converting section 111 carries out the training to generate, for example, a conversion equation of equation (1) which will be described later that correlates the transmission power of the associated channel and the reception quality of the packet channel from sample values ((x[0], y[0]), (x[1], y[1]), . . . , (x[N−1], y[N−1])) of a set of the received transmission power x[n] of the associated channel and the reception quality y[n] of the packet channel. These sample values comprise the transmission power value of the associated channel determined by the base station 101 during training mode and the reception quality value of the packet channel reported (fed back) from the terminal 102. The sample value y[n] is given as an impulse response with respect to the wireless propagation path characteristics of the transmission power of the (high speed) packet channel, the appearance of which is as illustrated in FIG. 14A, FIG. 14B and FIG. 14C which will be described later. Here, samples of the transmission power of the associated channel and the reception quality of the packet channel, which are used in the training, are referred to hereafter as training samples where appropriate.

5. The transmission power converting section 111 ends the training, for example, after a predetermined N samples of the training samples are collected, or at a point when a square error, which will be described later, becomes lower than a predetermined threshold. Then, it shifts the operation mode from the training mode to the normal mode.

6. After the training is finished, the transmission power converting section 111 obtains a predicted value (y') of the packet channel reception quality from the output of the power adjusting section 110 in accordance with equation (1) (or, as described later, a table that corresponds to equation (1)), and outputs it to the multiplexer 112. At the same time, the multiplexer 112 is controlled so that the output from the transmission power converting section 111 is selected.

7. Once the training is finished, the transmission power converting section 111 outputs that fact as a flag to the control data generating section 113. This flag is a flag that indicates the necessity or otherwise of transmission of a reception quality message y or the period of transmission, that is, the length of the transmission period which is considered based on the square error and the like which will be described later.

8. Once it receives the fact that the training has finished, the control data generating section 113 generates the transmission control information that is the message for stopping the reception quality message transmission by the terminal 102, and supplies it to the control data inserting section 114. The control data inserting section 114 inserts the transmission control information into the associated channel. Then transmission control information is thereafter transmitted to the terminal 102 as mentioned above.

9. If the training is again needed, for example, in a case where, judging from the reception quality message transmitted in predetermined periods, the prediction error in the predicted value of the reception quality of the packet channel is judged to be higher than the predetermined threshold, or in a case where NACK is frequently transmitted from the terminal 102, the transmission control information that is a message to start the reception quality message transmission by the terminal 102 is generated at the control data generating section 113 is inserted into the associated channel by the control data inserting section 114 and transmitted.

Figure 19:
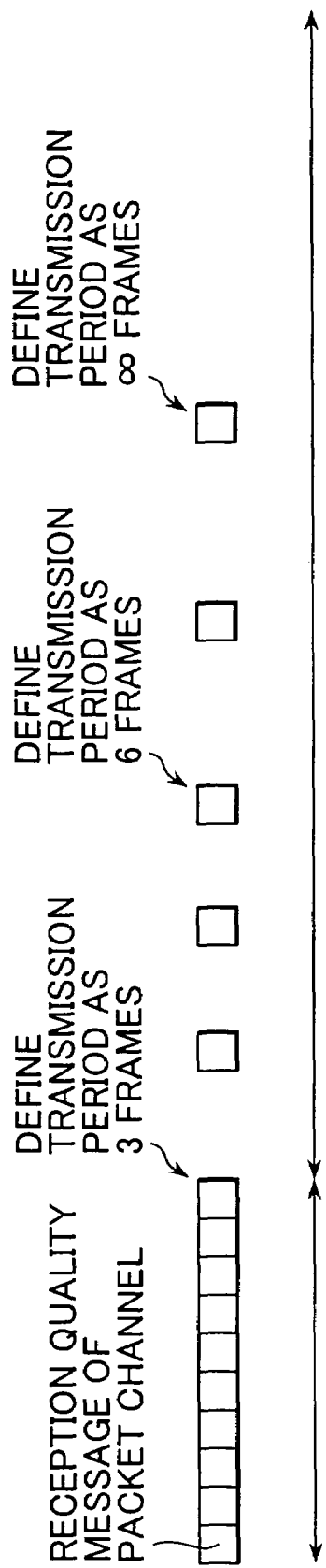
FIG. 19 is a view showing the transmission period of the reception quality message becoming longer.

10. In addition, although only the ON/OFF states of the reception quality message transmission is defined in the process above, it is also possible to change the reception quality message transmission frequency of the terminal 102 during the training mode or the normal mode. The transmission power converting section 111 derives the predicted value of the reception quality of the packet channel from equation (1) (or the table), and it enters the training mode and updates equation (1) (or the table) in accordance with the reception quality value of the packet channel represented by the reception quality message that is occasionally transmitted. In addition, in this case, the control data generating section 113 generates the transmission control information that is a message which specifies the transmission period of the reception quality message (FIG. 19). In FIG. 19, which will be described later, there is shown how the periods in which the reception quality message is transmitted from the terminal 102 to the base station 101 are controlled so as to be lengthened gradually as the square error becomes stable (approaches 0). After the end of the training period, it becomes the normal mode, and basically, the reception quality value of the packet channel is predicted based on the transmission power of the associated channel.

Next, the process at the base station 101 in FIG. 9 will be further described with reference to the flowchart of FIG. 10.

In the base station 101, when a call with the terminal 102 is established, at first, in step Si, the transmission power converting section 111 sets the operation mode to the training mode, and supplies a flag representing that fact to the multiplexer 112, and proceeds to step S2.

Figure 7:
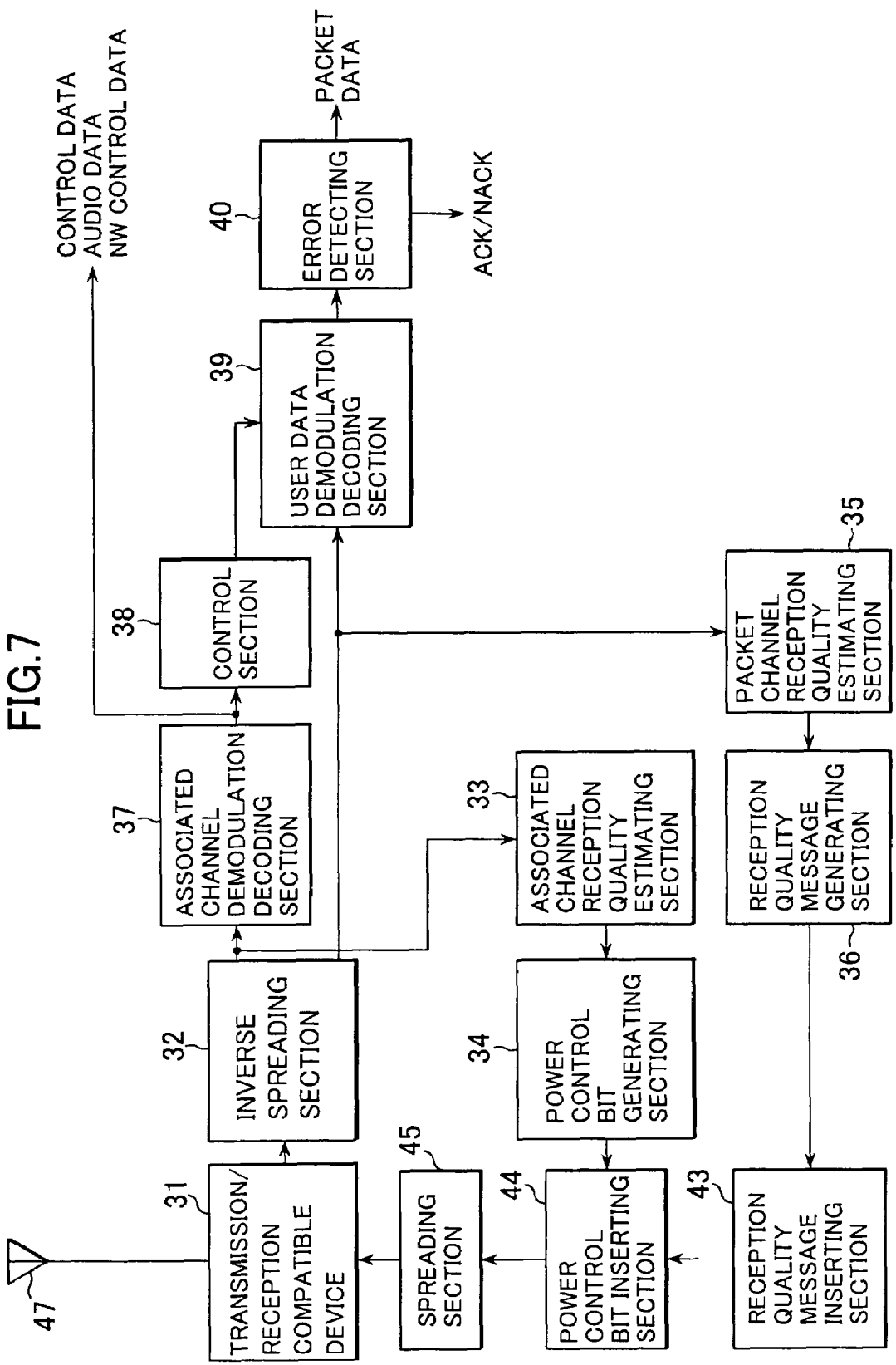
FIG. 7 is a view showing a configuration of an example of a conventional terminal.

Here, immediately after the call with the base station 101 is established, the terminal 102, for example, transmits the reception quality message, in frame periods as in the conventional terminal shown in FIG. 7. Thus, at the base station 102, which has a call with the terminal 102, established and is in the training mode, the reception quality message transmitted from the terminal 102 at frame periods can be received.

In step S2, transmission of the uplink control channel signal from the terminal is awaited, and that uplink control channel signal is received.

In other words, the uplink control channel signal transmitted from the terminal is received by the antenna 14, and is supplied to the power control bit extracting section 3 via the transmission/reception compatible device 1 and the inverse spreading section 2.

Then, it proceeds to step S3, and the power control bit extracting section 3 judges if the current timing is the timing of the slot period. In step S3, if the current timing is judged to be the timing of the slot period, it proceeds to step S4. The power control bit extracting section 3 extracts a power control bit transmitted at the timing of the slot period from the uplink control channel signal supplied from the spreading section 2, and supplies it to the power adjusting section 10, and also supplies the uplink control channel signal to the reception quality message extracting section 5. Then, it proceeds to step S5.

In step S5, the power adjusting section 10 changes the transmission power of the associated channel so as to become higher or lower by 1 dB than the current transmission power in accordance with the power control bit supplied from the power control bit extracting section 3, and supplies the altered transmission power x[n] to the transmission power converting section 111. Then, it proceeds to step S6.

On the other hand, in step S3, if the current timing is judged not to be the timing of the slot period, steps S4 and S5 are skipped to proceed to step S6, and the reception quality message extracting section 5 judges if the current timing is the timing of the frame period.

In step S6, if the current timing is judged not to be the timing of the frame period, it returns to step S2, and thereafter, similar processes are repeated.

In addition, in step S6, if the current timing is judged to be the timing of the frame period, that is, if the current timing is the timing of the frame period at which the reception quality message is supposed to be transmitted, it proceeds to step S7. The transmission power converting section 111 judges which of the training mode or the normal mode the current operation mode is.

In step S7, if the current operation mode is judged to be the training mode, it proceeds to step S8. A training mode process which will be described later is carried out. Then, it proceeds to step S9.

In step S9, the transmission power converting section 111 judges whether or not a training mode terminating event, which is an event that is to end the training mode and make the transition to the normal mode, has occurred.

Here, for example, it is possible to adopt as the training mode terminating event the fact that the predetermined N samples of the training samples are gathered as mentioned above, or the fact that the square error, which will be described later, becomes lower than the predetermined threshold.

In step S9, if it is judged that the training terminating event has not occurred, it returns to step S2 with the operation mode remaining in the training mode. Thereafter, similar processes are repeated.

In addition, in step S9, if it is judged that the training terminating event has occurred, it proceeds to step S10. By controlling the control data generating section 113, the transmission power converting section 111 generates transmission control information that instructs the transmission of the reception quality message from the terminal 102 to stop (for example, transmission control information instructing to make the transmission period infinite). Then, it proceeds to step S11.

In step S11, the transmission control information generated in step S10 is transmitted by the associated channel from the control data generating section 113 to the terminal 102 via the control data inserting sections 114 and 115, the encoding modulation section 9, the power adjusting section 10, the spreading section 11, the transmission/reception compatible device 1 and the antenna 14. Then, it proceeds to step S12. In step S12, the transmission power converting section 111 sets (changes) the operation mode from the training mode to the normal mode. It then returns to step S2, and thereafter, similar processes are repeated.

As mentioned above, in step S11, because the transmission control information that instructs the transmission of the reception quality message to stop is transmitted, thereafter, until the base station 101 transmits, in step S16, which will be described later, to the terminal 102 the transmission control information that instructs the transmission of the reception quality message to start, the terminal 102 stops the transmission of the reception quality message. Thus, it is possible to reduce power consumption at the terminal 102 and also to save radio resources for transmitting the reception quality message.

On the other hand, in step S7, if the current operation mode is judged to be the normal mode, it proceeds to step S13. A normal mode process which will be described later is carried out. Then, it proceeds to step S14.

In step S14, the transmission power converting section 111 judges if a training mode transition event, which is an event that is to end the normal mode and make the transition to the training mode, has occurred.

Here, it is possible do adopt as the training mode transition event, for example, as mentioned above, the fact that the square error of the predicted value of the reception quality is judged to be higher than the predetermined threshold, or the fact that NACK is frequently sent from the terminal 102.

In step S14, if it is judged that the training transition event has not occurred, it returns back to step S2 with the operation mode remaining in the normal mode, and thereafter, similar processes are repeated.

Also, in step S14, if it is judged that the training transition event has occurred, it proceeds to step S15. By controlling the control data generating section 113, the transmission power converting section 111 generates the transmission control information that instructs the transmission of the reception quality message from the terminal 102 to start (for example, transmission control information specifying that the transmission period is to be made per frame). Then, it proceeds to step S16.

In step S16, the transmission control information generated in step S15 is transmitted by the associated channel from the control data generating section 113 to the terminal 102 via the control data inserting sections 114 and 115, the encoding modulation section 9, the power adjusting section 10, the spreading section 11, the transmission/reception compatible device 1 and the antenna 14. Then, it proceeds to step S17. In other words, if the operation mode is set to the normal mode from the training mode in step S12 mentioned above, in the immediately preceding step S11, the transmission control information that instructs the transmission of the reception quality message to stop is transmitted to the terminal 102. Consequently, during the normal mode, the terminal 102 stops the transmission of the reception quality message.

On the other hand, in step S17 to follow, if the operation mode is set to the training mode from the normal mode, because the reception quality message becomes necessary in the training mode as will be described later, in step S16, the transmission control information that instructs the transmission of the reception quality message to start is transmitted to the terminal 102. Consequently, during the training mode, the terminal 102, for example, carries out transmission of the reception quality message in frame periods as in the conventional case.

In step S17, the transmission power converting section 111 sets (changes) the operation mode from the normal mode to training. It returns to step S2. Then, similar processes are repeated.

Figure 10:
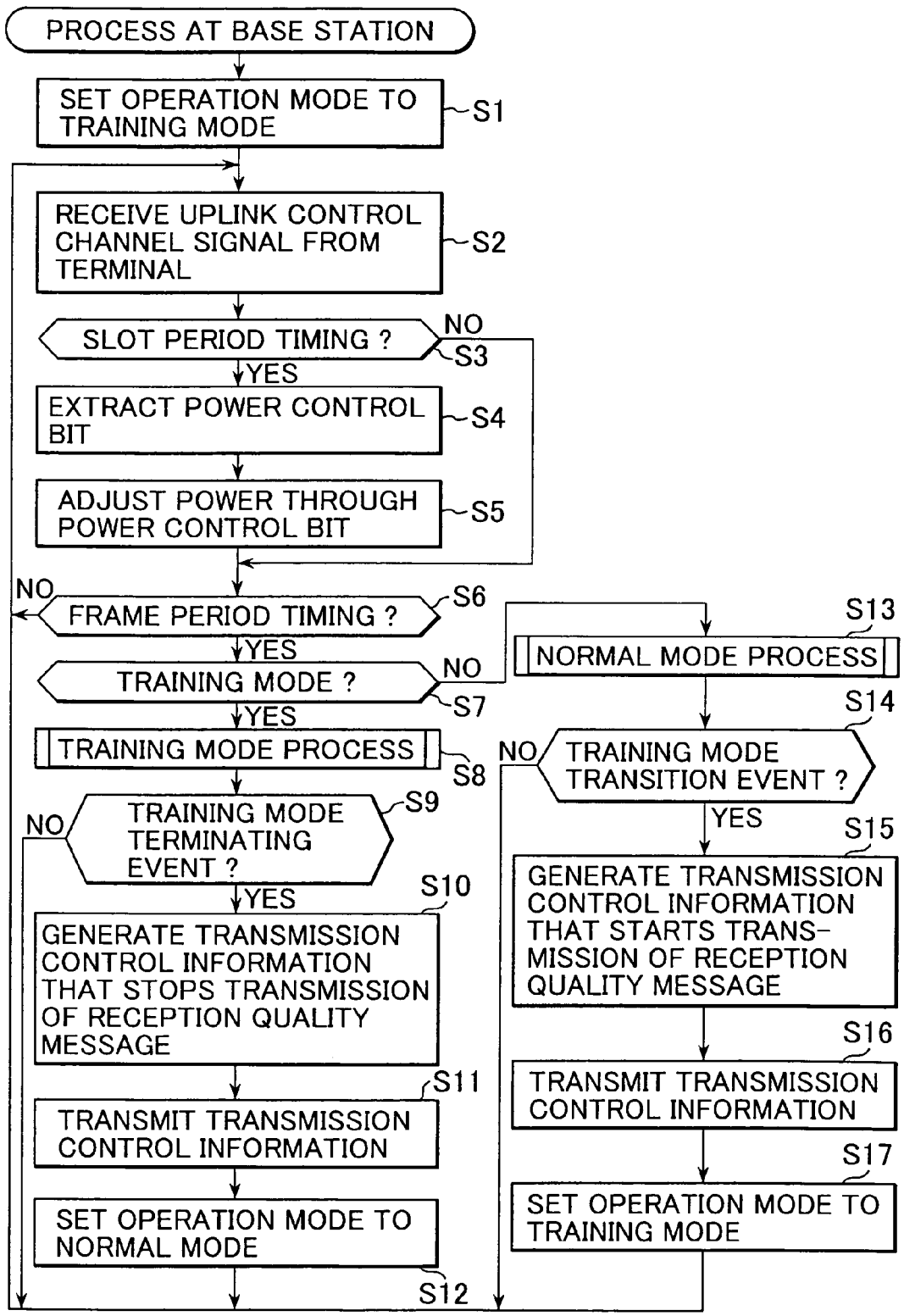
FIG. 10 is a flowchart explaining a process at the base station 101.

In addition, the process of the flowchart shown in FIG. 10 (as well as FIG. 17 which will be described later) is ended, for example, when the call between the base station 101 and the terminal 102 is disconnected.

Next, the process of the training mode in step S8 of FIG. 10 will be described with reference to the flowchart of FIG. 11.

In the training mode process, at first, in step S21, the reception quality message extracting section 5 extracts the reception quality message representing the reception quality of the packet channel from the uplink control channel signal supplied from the power control bit extracting section 3, and supplies it to the transmission power converting section 111 and the multiplexer 112.

In other words, as explained in steps S14 to S17 of FIG. 10, when the operation mode is set to the training mode, the transmission control information that instructs the transmission of the reception quality message to start is transmitted. Therefore, during the training mode, the reception quality message is transmitted from the terminal 102 to the base station 102, but the reception quality message extracting section 5 thus extracts the reception quality message transmitted from the terminal 102, and supplies it to the transmission power converting section 111 and the multiplexer 112.

When the transmission power converting section 111 receives the reception quality message from the reception quality message extracting section 5, it proceeds to step S22. The transmission power converting section 111 uses the reception quality y[n] of the packet channel represented by the reception quality message and the transmission power x[n] of the associated channel outputted by the power adjusting section 10 to carry out the training (learning) of the predictive equation for calculating the predicted value y'[n] of the reception quality of the packet channel.

Figure 12:
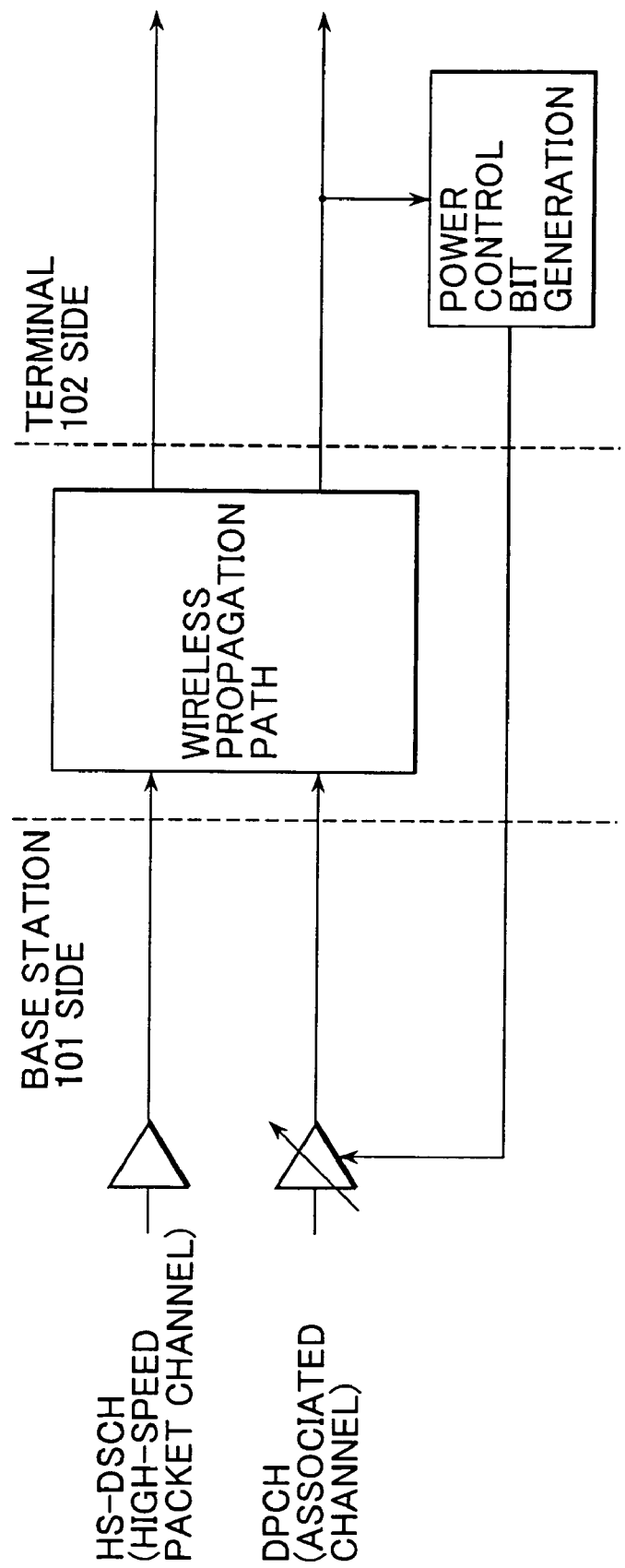
FIG. 12 is a view explaining power control of an associated channel.

Here, from the base station 101 to the terminal 102, as shown in FIG. 12, at least signals of the packet channel (HS-DSCH) and the associated channel (DPCH) are transmitted. However, as for the associated channel of these two channels, the terminal 102 generates the power control bit which requests the increase or decrease in the transmission power thereof, and transmits it to the base station 101. Then, the base station 101 adjusts the transmission power of the associated channel in accordance with this power control bit so that the reception quality of the associated channel in the terminal 102 becomes constant as a result.

Figure 13A:
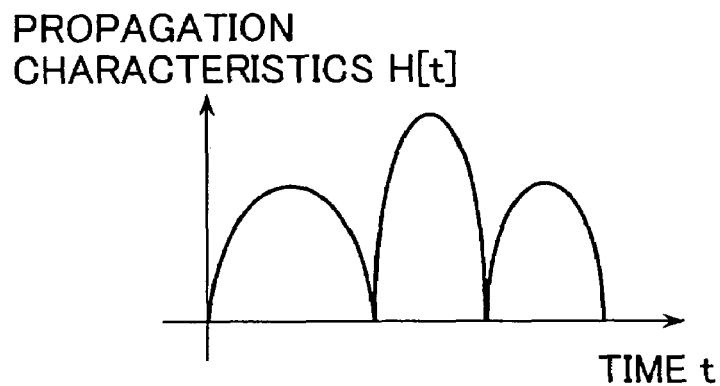
FIG. 13A is a view showing propagation characteristics.

In other words, if it is assumed that t represents time and the propagation path characteristics H[t] of the radio waves are, for example, as shown in FIG. 13A, the base station 101 controls (adjusts) the transmission power of the associated channel to have inverse characteristics to the propagation path characteristics H[t]. Consequently, the reception quality of the associated channel at the terminal 102 is maintained constant, as shown in FIG. 13C.

On the other hand, with respect to the packet channel, the base station 101 does not perform transmission power control like that for the associated channel. It carries out transmission at a constant transmission power, for example, as shown in FIG. 14A. Thus, if the propagation characteristics H[t] of the radio waves are assumed to be something like those shown FIG. 14B which is identical to FIG. 13A, the reception quality of the packet channel at the terminal 102, as shown in FIG. 14C, becomes one that is directly influenced by the propagation characteristics H[t].

Figure 13B:
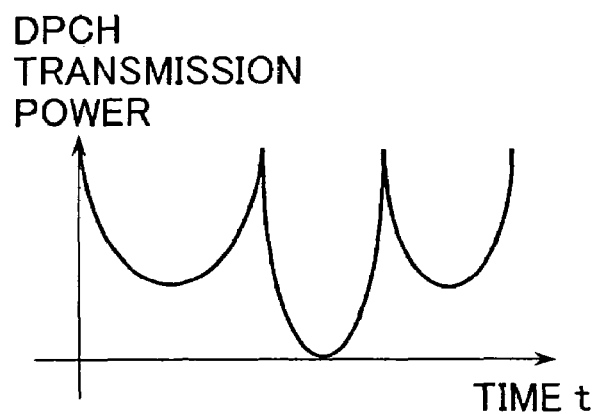
FIG. 13B is a view showing the transmission power of the associated channel.
Figure 13C:
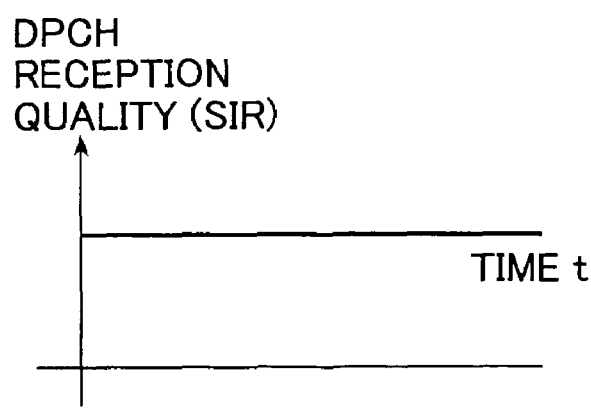
FIG. 13C is a view showing the reception quality of the associated channel.

Thus, because the transmission power of the associated channel becomes the inverse characteristics to the propagation characteristics H[t] as shown in FIG. 13B, and the reception quality of the packet channel at the terminal 102 is one that is directly influenced by the propagation characteristics H[t] as shown in FIG. 14C, the transmission power of the associated channel and the reception quality of the packet channel are correlated such that they have what could be described as a complementary relation.

Thus, the transmission power of the associated channel can be mapped to the reception quality of the packet channel correlated with that transmission power. Through this mapping, it is possible to predict the reception quality of the packet channel from the transmission power of the associated channel.

As such, now, the predicted value y'[n] of the reception quality of the packet channel is calculated using the transmission power x[n] of the associated channel with, for example, a linear expression defined by parameters a and b below as a predictive equation.

$$y'[n] = ax[n] + b \quad (1)$$

If the prediction error of the predicted value y'[n] of the reception quality calculated with the predictive equation of equation (1) is represented as e[n], this prediction error e[n] can be expressed by equation (2).

$$e[n] = y[n] - y'[n] \quad (2)$$

Since it is difficult to determine the parameters a and b that make the prediction error e[n] of equation (2) to always be 0, here, parameters a and b that minimize, for example, the square error as statistical errors (error metrics) calculated from the prediction error e[n] of equation (2) are determined.

Now, if the square error of the prediction error e[n] in equation (2) is represented by E, the square error E can be expressed through equation (3).

$$E = \sum_{n=0}^{N-1} \{e[n]\}^2 \quad (3)$$

In addition, in equation (3), sets of N samples of the transmission power x[n] of the associated channel and the reception quality y[n] of the packet channel ((x[0], y[0]), (x[1], y[1]), ..., (x[N−1], y[N−1])) are used as training samples.

When equation (2) is substituted into equation (3), equation (4) can be obtained.

$$E = \sum_{n=0}^{N-1} (y[n] - y'[n])^2 \quad (4)$$

Moreover, by substituting equation (1) into equation (4), equation (5) can be obtained.

$$E = \sum_{n=0}^{N-1} (y[n] - (ax[n] + b))^2 \quad (5)$$

When equation (5) is partially differentiated with respect to each of the parameters a and b, equations (6) and (7) can be obtained.

$$\frac{\partial E}{\partial a} = -2 \sum_{n=0}^{N-1} x[n](y[n] - (ax[n] + b)) \quad (6)$$

$$\frac{\partial E}{\partial b} = -2 \sum_{n=0}^{N-1} (y[n] - (ax[n] + b)) \quad (7)$$

The minimum value (the smallest value) of the square error E of equation (3) are given by the parameters a and b which make the right sides of equations (6) and (7) 0. As such, if the right sides of the equations (6) and (7) are set to 0, equation (8) and equation (9) can be obtained from equation (6) and equation (7), respectively.

$$N \sum_{n=0}^{N-1} x[n]y[n] = Nb \sum_{n=0}^{N-1} x[n] + Na \sum_{n=0}^{N-1} \{x[n]\}^2 \quad (8)$$

$$Nb = \sum_{n=0}^{N-1} y[n] - a \sum_{n=0}^{N-1} x[n] \quad (9)$$

By substituting equation (9) into equation (8), the parameter a, which minimizes the square error E, can be determined by equation (10).

$$a = \frac{N \sum_{n=0}^{N-1} x[n]y[n] - \sum_{n=0}^{N-1} x[n] \sum_{n=0}^{N-1} y[n]}{N \sum_{n=0}^{N-1} \{x[n]\}^2 - \left(\sum_{n=0}^{N-1} x[n]\right)^2} \quad (10)$$

In addition, from equations (9) and (10), the parameter b that minimizes the square error E can be calculated with equation (11).

$$b = \frac{\sum_{n=0}^{N-1} y[n] - a \sum_{n=0}^{N-1} x[n]}{N} \quad (11)$$

Figure 11:
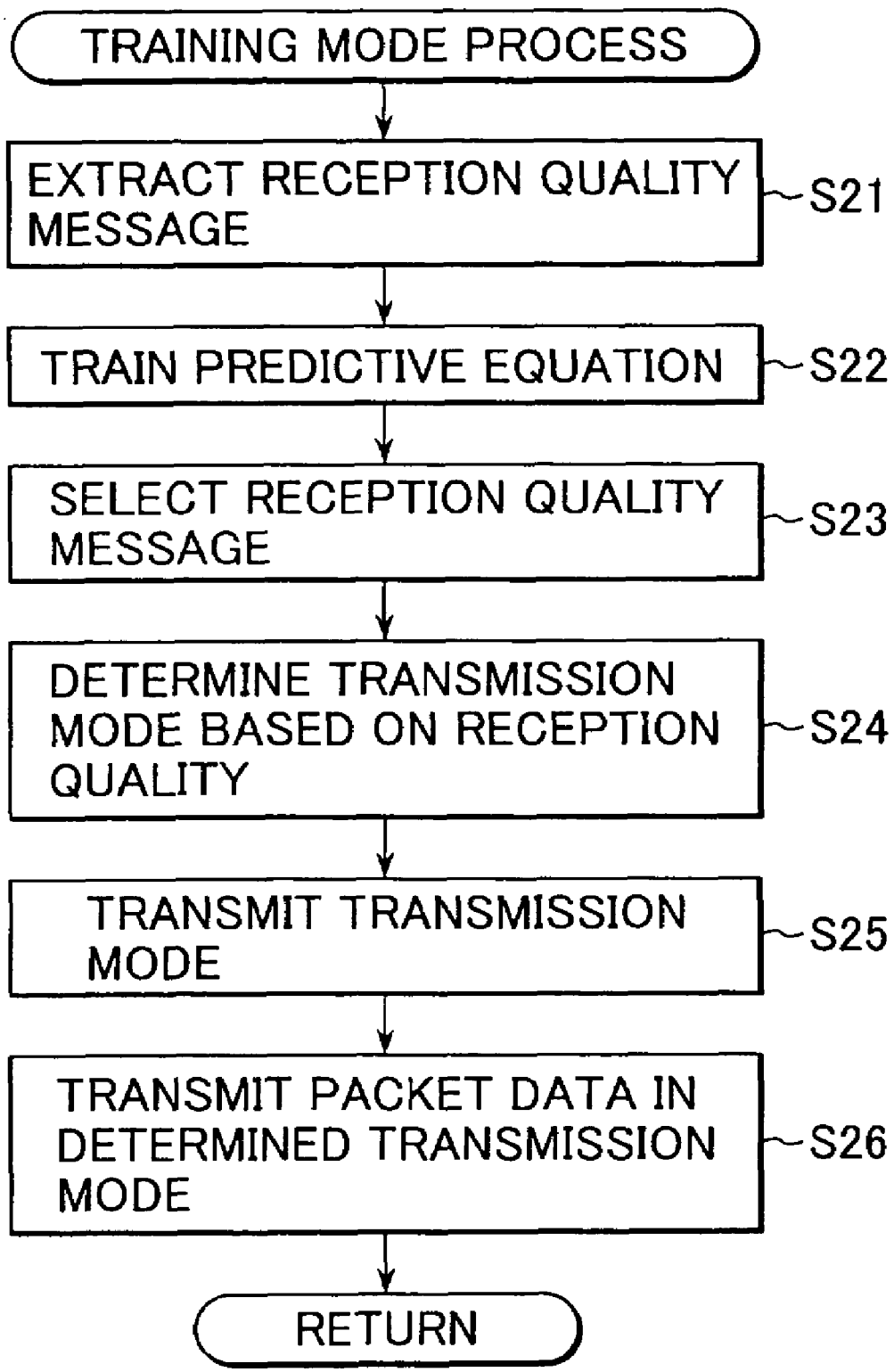
FIG. 11 is a flowchart explaining a process of a training mode.

In step S22 of FIG. 11, by computing equations (10) and (11) using the reception quality y[n] of the packet channel and the transmission power x[n] of the associated channel, the transmission power converting section 111 carries out training to determine the parameters a and b that define the predictive equation of equation (1). Then, it proceeds to step S23.

Here, x[n] of equation (1) is the absolute transmission power of the associated channel, and is dependent upon the data transmitted through the associated channel, namely, the QoS (Quality of Service) of a provided service, the process gain of a physical channel and the characteristics of a receiver (the terminal 102). However, according to equation (1), it is possible to, taking those above into consideration, correlate (map) the absolute transmission power of the associated channel with the reception quality of the packet channel.

In addition, here, although the predicted value y'[n] of the reception quality of the packet channel is calculated with the linear expression of equation (1), this predicted value y'[n] can also be calculated with an equation of an order of or above a quadratic expression. Moreover, here, although the absolute transmission power x[n] of the associated channel is used to calculate the predicted value y'[n] of the reception quality of the packet channel, this predicted value y'[n] can also be calculated, in addition, for example, using changes in the transmission power of the associated channel and the like.

In other words, if the reception quality represented by the previous reception quality message transmitted from the terminal 102 is represented by SIRprv and the change in the transmission power of the associated channel caused by the power control bits received from when that reception quality message was received up to the present is represented by Δx[n], then the predicted value y'[n] of the reception quality of the packet channel can be predicted, for example, in accordance with the following equation.

$$y'[n]=a\Delta x[n]+b+SIR_{prv} \quad (12)$$

In step S23, the transmission power converting section 111 controls the multiplexer 112 so that the output of the reception quality message extracting section 5 is selected and supplied to the mode judging section 6. Consequently, the reception quality message outputted by the reception quality message extracting section 5 is supplied to the mode judging section 6 via the multiplexer 112.

Then, it proceeds to step S24. The mode judging section 6 determines the code rate and the modulation method (the transmission mode) in the adaptive encoding modulation section 13 based on the reception quality represented by the reception quality message supplied from the multiplexer 112, and supplies it to the control section 7. Then, it proceeds to step S25.

In step S25, the control section 7 supplies the transmission mode supplied from the mode judging section 6 to the control data generating section 8, and the control data generating section 8 generates control data including that transmission mode. This control data is supplied from the control data generating section 8 to the antenna 14 via the control data inserting section 115, the encoding modulation section 9, the power adjusting section 10, the spreading section 11 and the transmission/reception compatible device 1, and is transmitted as an associated channel signal from the antenna 14.

After that, it proceeds to step S26. The packet data in which the user data addressed to the terminal 102 is arranged is transmitted in the transmission mode determined by the mode judging section 6 and it is returned.

In other words, in step S26, the user data addressed to the terminal 102 is arranged in a packet and is sent as packet data to the adaptive encoding modulation section 13. Then, the control section 7 controls the adaptive encoding modulation section 13 so as to encode and modulate the packet data addressed to the terminal 102 in the transmission mode determined by the mode judging section 6. The adaptive encoding modulation section 13, in accordance with the control of the control section 7, encodes and modulates the packet data addressed to the terminal 102 that is supplied thereto, and supplies it to the spreading section 11. Thereafter, processes similar to the case explained in FIG. 2 are performed in the spreading section 11 and the transmission/reception compatible device 1. Consequently, the packet data is transmitted from the antenna 14 to the terminal 102 as a packet channel signal.

In addition, in the training of the parameters a and b in step S22 of FIG. 11, by calculating equation (10) and (11) using only the transmission power x[n] of the associated channel and the reception quality y[n] represented by the reception quality message obtained during the most recent training mode period, new parameters a and b are obtained. With the new parameters a and b, the parameters a and b obtained in the training performed previously are updated. However, the updating of the parameters a and b can be performed using the transmission power x[n] of the associated channel and the reception quality y[n] represented by the reception quality message obtained in past training mode periods as well.

In other words, in the training of the parameters a and b, by calculating equations (10) and (11) using, for example, all of the transmission powers x[n] of the associated channel and the reception qualities y[n] represented by the reception quality messages obtained in the training periods up to that point, new parameters a and b can be obtained. With the new parameters a and b, the parameters a and b obtained in the previously performed training can be updated.

Figure 16:
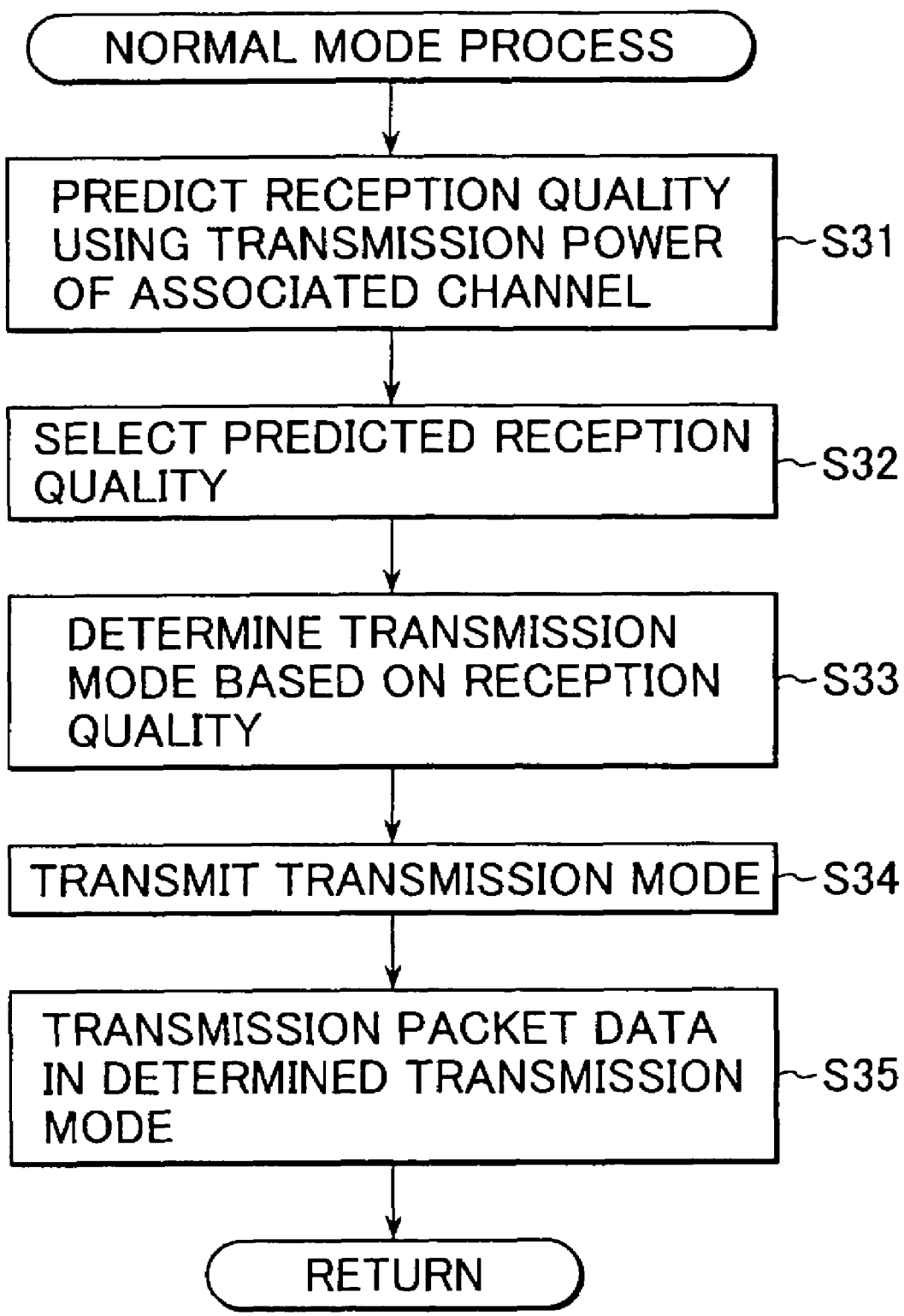
FIG. 16 is a flowchart explaining a process of a normal mode.

Next, the normal mode process in step S13 of FIG. 10 will be described below with reference to the flowchart of FIG. 16.

In the normal mode process, at first, in step S31, the transmission power converting section 111 uses the transmission power x[n] of the associated channel outputted by the power adjusting section 10 and calculates the predicted value y'[n] of the reception quality of the packet channel in the terminal 102.

In other words, during the normal mode, as explained in FIG. 10, the terminal 102 stops transmission of the reception quality message. Thus, the base station 101 cannot recognize the reception quality at the terminal 102 from the reception quality message. As such, in step S31, the transmission power converting section 111 calculates the predicted value y'[n] of the reception quality of the packet channel using the transmission power x[n] of the associated channel in accordance with equation (1) defined by the most recent parameters a and b obtained through the training in step S22 of FIG. 11 performed most recently.

Then, the transmission power converting section 111 supplies the predicted value y'[n] of the reception quality to the multiplexer 112. It proceeds from step S31 to step S32.

Here, equation (1) defined by the parameters a and b minimizes the square error E of the prediction error of the predicted value y'[n] of the reception quality of the packet channel obtained through equation (1), as mentioned above. Thus, the reception quality of the packet channel can be predicted accurately.

In addition, in step S31, instead of calculating equation (1), it is possible to obtain the predicted value of the reception quality using a table. In other words, a plurality of representative values of the transmission power of the associated channel are substituted into equation (1), and representative values of the predicted values of the reception quality of the packet channel are calculated. Moreover, a table that correlates the representative values of the transmission power of the associated channel with the representative values of the predicted values of the reception quality of the packet channel is prepared. In step S31, the predicted value y'[n] of the reception quality correlated with the transmission power x[n] of the associated channel may be obtained by referring to such a table.

In step S32, the transmission power converting section 111 controls the multiplexer 112 so that the output of the transmission power converting section 111 is selected and supplied to the mode judging section 6. Consequently, the predicted value of the reception quality calculated at the transmission power converting section 111 is supplied to the mode judging section 6 via the multiplexer 112.

Then, it proceeds to step S33. The mode judging section 6 determines the code rate and the modulation method (the transmission mode) in the adaptive encoding modulation section 13 based on the predicted value of the reception quality supplied from the multiplexer 112, and supplies it to the control section 7. Then, it proceeds to step S34.

In step S34, the control section 7 supplies to the control data generating section 8 the transmission mode supplied from the mode judging section 6, and the control data generating section 8 generates the control data including that transmission mode. This control data is supplied from the control data generating section 8 to the antenna 14 via the control data inserting section 115, the encoding modulation section 9, the power adjusting section 10, the spreading section 11 and the transmission/reception compatible device 1, and is transmitted from the antenna 14 as an associated channel signal.

Thereafter, it proceeds to step S35. The packet data, in which user data addressed to the terminal 102 is arranged, is transmitted in the transmission mode determined by the mode judging section 6 and it returns.

In other words, in step S35, the user data addressed to the terminal 102 is arranged in the packet and is supplied to the adaptive encoding modulation section 13 as packet data. Then, the control section 7 controls the adaptive encoding modulation section 13 so as to encode and modulate the packet data addressed to the terminal 102 in the transmission mode determined by the mode judging section 6. In accordance with the control of the control section 7, the adaptive encoding modulation section 13 encodes and modulates the packet data supplied thereto that is addressed to the terminal 102, and supplies it to the spreading section 11. Thereafter, at the spreading section 11 and the transmission/reception compatible device 1, processes similar to the case explained in FIG. 2 are performed. Consequently, the packet data is transmitted from the antenna 14 to the terminal 102 as a packet channel signal.

Next, in the processes at the base station 101 explained in FIG. 10 to FIG. 16, the training mode and the normal mode are provided as operation modes and the parameters a and b of equation (1) are updated each time the operation mode becomes the training mode. However, since the training of the parameters a and b can be done if the reception quality message and the transmission power of the associated channel can be recognized, it is possible to update the parameters a and b with each reception of the reception quality message transmitted from the terminal 102 without providing the operation modes such as the training mode and the normal mode.

In addition, in the processes at the base station 101 explained in FIG. 10 to FIG. 16, the transmission control information that instructs the transmission of the reception quality message to start is transmitted to the terminal 102 during the training mode, thereby making the transmission of the reception quality message be performed in frame periods as is done conventionally, and also the transmission control information that instructs the transmission of the reception quality message to stop is transmitted to the terminal 102 during the normal mode, thereby stopping the transmission of the reception quality message. However, as for the transmission of the reception quality message from the terminal 102, it is possible to control the transmission frequency thereof, and not just whether the transmission thereof is performed or not performed.

As such, another embodiment of the process at the base station 101 is described with reference to the flowchart of FIG. 17.

At the base station 101, when a call between the terminal 102 is established, firstly in step S41, transmission of the uplink control channel signal from the terminal is awaited, and the uplink control channel signal is received.

In other words, the uplink control channel signal transmitted from the terminal is received by the antenna 14 and is supplied to the power control bit extracting section 3 via the transmission/reception compatible device 1 and the inverse spreading section 2.

Then, it proceeds to step S42. The power control bit extracting section 3 judges whether or not the current timing is the timing of the slot period. In step S42, if the current timing is judged to be the timing of the slot period, it proceeds to step S43. The power control bit extracting section 3 extracts from the uplink control channel signal supplied from the spreading section 2 the power control bit transmitted at the timing of the slot period, and supplies it to the power adjusting section 10, and also supplies the uplink control channel signal to the reception quality message extracting section 5. Then, it proceeds to step S44.

In step S44, the power adjusting section 10 changes the transmission power of the associated channel so as to be higher or lower than the current transmission power by 1 dB in accordance with the power control bit supplied from the power control bit extracting section 3, and supplies the altered transmission power x[n] to the transmission power converting section 111. Then, it proceeds to step S45.

On the other hand, in step S42, if the current timing is judged not to be the timing of the slot period, steps S43 and S44 are skipped and it proceeds to step S45. The reception quality message extracting section 5 judges whether or not the current timing is the timing of the frame period.

In step S45, if the current timing is judged not to be the timing of the frame period, it returns to step S41. Thereafter, similar processes are repeated.

In addition, in step S45, if the current timing is judged to be the timing of the frame period, that is, if the current timing is the timing of the frame period at which the reception quality message is supposed to be transmitted, it proceeds to step S46. The transmission power converting section 111 judges if the current timing is a message reception timing for receiving the reception quality message transmitted from the terminal 102.

Here, in the embodiment of FIG. 17, in step S56, which will be described later, transmission control information, for example, which indicates the transmission period as the transmission frequency of the reception quality message, is generated and transmitted to the terminal 102. The terminal 102 transmits the reception quality message at the transmission period indicated by the transmission control information. Thus, at the base station 101, the timing at which the reception quality message is transmitted from the terminal 102 can be recognized through the transmission control information transmitted to the terminal 102. Thus, in step S46, it is judged if the current timing is the message reception timing.

Figure 17:
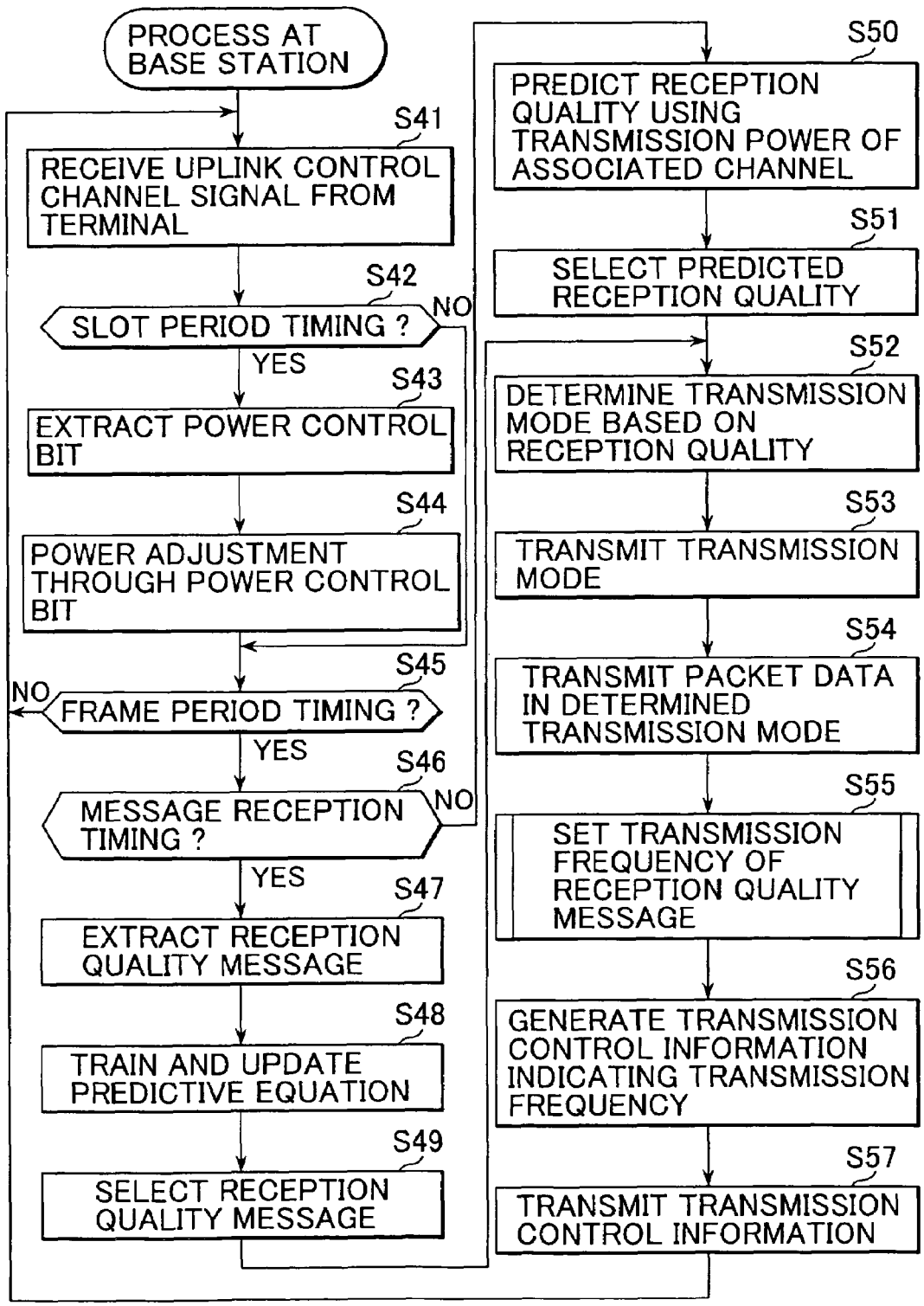
FIG. 17 is a flowchart explaining another embodiment of a process at the base station 101.

In addition, immediately after the process at the base station 101 of FIG. 17 is started, the transmission period indicated by the transmission control information is initially set to the frame period that is, for example, the period in which conventional terminals transmit the reception quality message.

In step S45, if the current timing is judged to be the message reception timing, it proceeds to step S47. The reception quality message extracting section 5 extracts the reception quality message from the uplink control channel signal supplied from the power control bit extracting section 3, and supplies it to the transmission power converting section 111 and the multiplexer 112. Then, it proceeds to step S48.

In step S48, the transmission power converting section 111 uses the reception quality y[n] of the packet channel represented by the reception quality message from the reception quality message extracting section 5 and the transmission power x[n] of the associated channel outputted by the power adjusting section 10 to perform the training (learning) of the parameters a and b that define the predictive equation of equation (1) to calculate the predicted value y'[n] of the reception quality of the packet channel. With the new parameters a and b obtained by the training, the parameters obtained by the training in step S48 of the previous round are updated (overwritten).

Thus, in step S48, for example, the reception qualities y[n] indicated by the reception quality messages transmitted from the terminal 102 from when the call is established between the base station 101 and the terminal 102 up to the present, and the transmission powers x[n] of the associated channel outputted by the power adjusting section 10 are used to carry out the training of the parameters a and b.

However, in the training of step S48, in addition, it is also possible to obtain the parameters a and b by computing equations (10) and (11) using, for example, the transmission powers x[n] and the reception qualities y[n] obtained within a timing going back by a predetermined time, or the latest predetermined number of the transmission powers x[n] and the reception qualities y[n] among the transmission powers x[n] and the reception qualities y[n] obtained up until the present.

Moreover, in step S48, in computing equations (10) and (11) using the reception quality y[n] and the transmission power x[n], it is possible to, for example, applying a larger weighting factor the more recent the reception quality y[n] and the transmission power x[n] are.

After the process of step S48, it proceeds to step S49. The transmission power converting section 111 controls the multiplexer 112 so that the output of the reception quality message extracting section 5 is selected and supplied to the mode judging section 6. Consequently, the reception quality message outputted by the reception quality message extracting section 5 is supplied to the mode judging section 6 via the multiplexer 112.

Then, it proceeds to step S52. The mode judging section 6 determines the code rate and the modulation method (the transmission mode) in the adaptive encoding modulation section 13 based on the reception quality represented by the reception quality message supplied from the multiplexer 112, and supplies it to the control section 7. Then, it proceeds to step S53.

In step S53, the control section 7 supplies to the control data generating section 8 the transmission mode supplied from the mode judging section 6, and the control data generating section 8 generates control data including the transmission mode. This control data is supplied from the control data generating section 8 to the antenna 14 via the control data inserting section 115, the encoding modulation section 9, the power adjusting section 10, the spreading section 11 and the transmission/reception compatible device 1, and is transmitted from the antenna 14 as an associated channel signal.

Thereafter, it proceeds to step S54. Packet data in which user data addressed to the terminal 102 is arranged is transmitted in the transmission mode determined by the mode judging section 6.

In other words, in step S54, the user data addressed to the terminal 102 is arranged in a packet and is supplied to the adaptive encoding modulation section 13 as packet data. Then, the control section 7 controls the adaptive encoding modulation section 13 so as to encode and modulate the packet data addressed to the terminal 102 in the transmission mode determined by the mode judging section 6. Thus, if the reception quality message from the terminal 102 is received, the adaptive encoding modulation section 13, in accordance with the transmission mode determined based on the reception quality represented by the reception quality message from the terminal 102, encodes and modulates the packet data supplied thereto that is addressed to the terminal 102, and supplies it to the spreading section 11. Thereafter, in the spreading section 11 and the transmission/reception compatible device 1, processes similar to the case explained in FIG. 2 are performed. Consequently, the packet data is transmitted from the antenna 14 to the terminal 102 as the packet channel signal.

On the other hand, in step S46, if the current timing is judged not to be the message reception timing at which the reception quality message is received, it proceeds to step S50. The transmission power converting section 111 uses the transmission power x[n] of the associated channel outputted by the power adjusting section 10 and calculates the predicted value y'[n] of the reception quality of the packet channel at the terminal 102.

In other words, since the current timing is not the message reception timing, the reception quality message is not transmitted from the terminal 102. Thus, at the base station 101, the reception quality at the terminal 102 cannot be recognized from the reception quality message. As such, in step S50, the transmission power converting section 111 calculates the predicted value y'[n] of the reception quality of the packet channel using the transmission power x[n] of the associated channel in accordance with equation (1) defined by the most recent parameters a and b determined through the training in step S48 performed most recently.

Then, the transmission power converting section 111 supplies the predicted value y'[n] of the reception quality to the multiplexer 112. It proceeds from step S50 to step S51.

In step S51, the transmission power converting section 111 controls the multiplexer 112 so that the output of the transmission power converting section 111 is selected and supplied to the mode judging section 6. Thus, the predicted value of the reception quality calculated by the transmission power converting section 111 is supplied to the mode judging section 6 via the multiplexer 112.

Then, it proceeds to step S52. The mode judging section 6 determines the code rate and the modulation method (the transmission mode) in the adaptive encoding modulation section 13 based on the predicted value of the reception quality supplied from the multiplexer 112, and supplies it to the control section 7. Then, it proceeds to step S53.

In step S53, the control section 7 supplies to the control data generating section 8 the transmission mode supplied from the mode judging section 6, and the control data generating section 8 generates control data including the transmission mode. This control data is supplied from the control data generating section 8 to the antenna 14 via the control data inserting section 115, the encoding modulation section 9, the power adjusting section 10, the spreading section 11 and the transmission/reception compatible device 1, and is transmitted from the antenna 14 as an associated channel signal.

Thereafter, it proceeds to step S54. Packet data in which user data addressed to the terminal 102 is arranged is transmitted in the transmission mode determined by the mode judging section 6.

In other words, in step S54, the user data addressed to the terminal 102 is arranged in a packet and supplied to the adaptive encoding modulation section 13 as packet data. Then, the control section 7 controls the adaptive encoding modulation section 13 so as to encode and modulate the packet data addressed to the terminal 102 in the transmission mode determined by the mode judging section 6. Thus, if the reception quality message is not sent from the terminal 102, the adaptive encoding modulation section 13 encodes and modulates the packet data addressed to the terminal 102 that is supplied thereto in accordance with the transmission mode determined based on the predicted value of the reception quality, and supplies it to the spreading section 11. Thereafter, at the spreading section 11 and the transmission/reception compatible device 1, processes similar to the case explained in FIG. 2 are performed. Thus, the packet data is transmitted from the antenna 14 to the terminal 102 as a packet channel signal.

After the process of step S54, it proceeds to step S55. The transmission power converting section 111 performs a process for setting the transmission period (the transmission frequency) of the reception quality message by the terminal 102, and supplies the transmission period obtained as a result to the control data generating section 113. Then, it proceeds to step S56.

In step S56, the control data generating section 113 generates transmission control information that indicates the transmission period of the reception quality message supplied from the transmission power converting section 111. Then, it proceeds to step S57.

In step S57, the transmission control information generated in step S56 is transmitted from the control data generating section 113 to the terminal 102 by the associated channel via the control data inserting sections 114 and 115, the encoding modulation section 9, the power adjusting section 10, the spreading section 11, the transmission/reception compatible device 1 and the antenna 14. It returns to step S41, and thereafter, similar processes are repeated.

In addition, in the embodiment of FIG. 17, although in steps S56 and S57, the transmission control information is always generated and transmitted to the terminal 102, alternatively, it is possible to generate and transmit the transmission control information, for example, only when a transmission period different from the transmission period indicated by the transmission control information transmitted in the previous step S55 is set.

Figure 18:
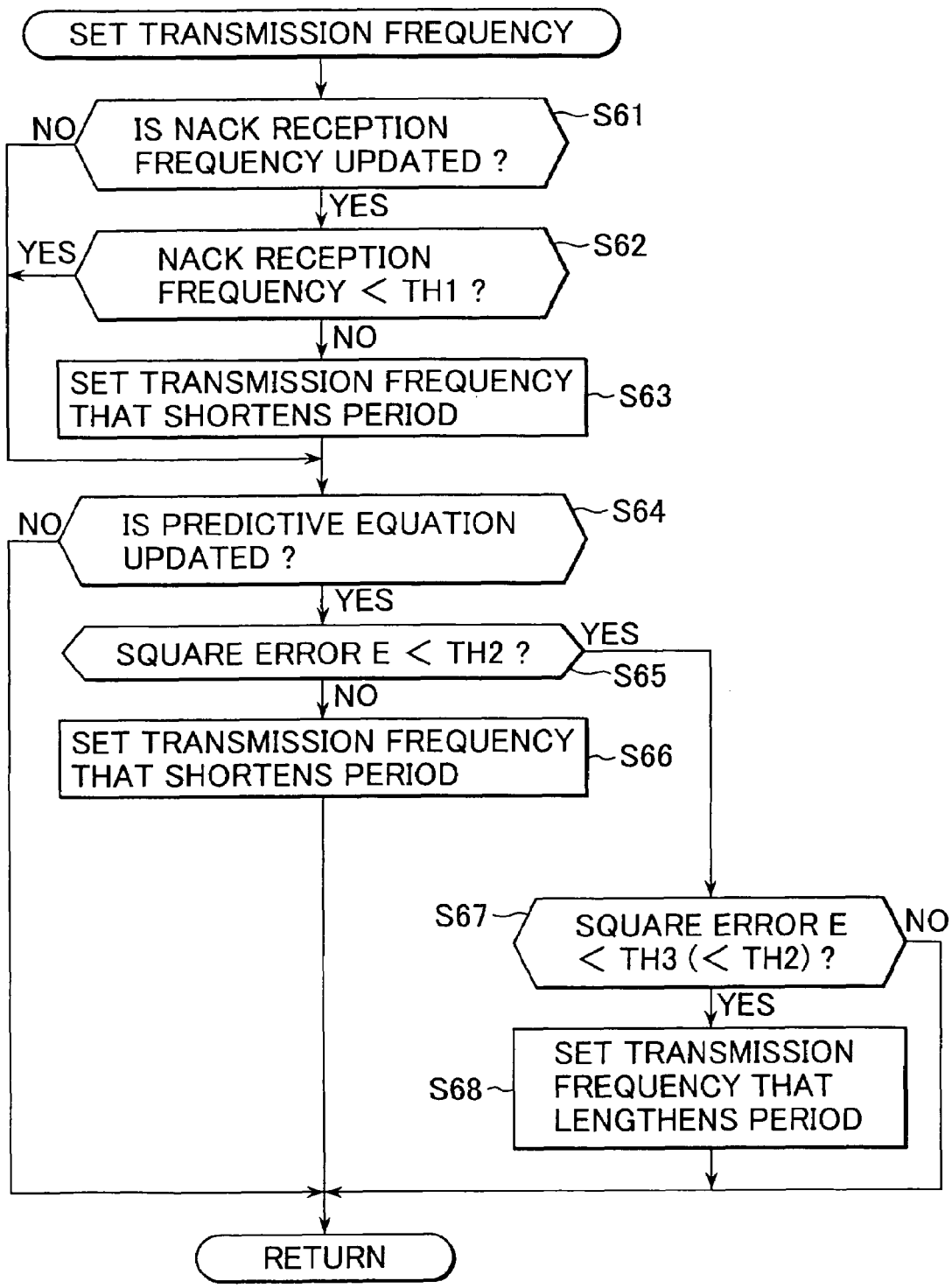
FIG. 18 is a flowchart explaining a process for setting a transmission period of a reception quality message.

The setting process for the transmission period (the transmission frequency) of the reception quality message performed in step S55 of FIG. 17 will be described next with reference to the flowchart of FIG. 18.

In the setting process for the transmission period (transmission frequency) of the reception quality message, first, in step S61, the transmission power converting section 111 judges if the reception frequency of NACK transmitted from the terminal 102 is updated.

In other words, as in the conventional terminal of FIG. 7, the terminal 102, if the packet data could be received properly, transmits ACK which indicates so, and if the packet data could not be received properly, transmits NACK which indicates so to the base station 101, for example, through the uplink control channel. The transmission power converting section 111, when it receives a new ACK/NACK, uses the most recent K ACK/NACKs received up to that point to update the reception frequency of NACK. In other words, the transmission power converting section 111, when it receives a new ACK/NACK, if it is assumed that of the K most recent ACK/NACKs received up to that point there are K' and K–K' ACKs and NACKs, respectively, obtains a new NACK reception frequency, for example, by calculating the equation (K–K')/K×100%, and according to the new reception frequency of NACK, updates the reception frequency of NACK obtained when the previous ACK/NACK was received.

In step S61, after the process of the previous step S61 is performed, it is judged if such an update of the reception frequency of NACK as mentioned above has been carried out.

If, in step S61, it is judged that the reception frequency of NACK has not been updated, steps S62 and S63 are skipped and it proceeds to step S64.

In addition, in step S61, if it is judged that the reception frequency of NACK has been updated, it proceeds to step S62. The transmission power converting section 111 judges if the reception frequency of NACK is less than (or at or below) a predetermined threshold TH1.

In step S62, if the reception frequency of NACK is judged not to be less than the predetermined threshold TH1, that is, if the reception frequency of NACK is high, and therefore packet data often cannot be received properly at the terminal 102, it proceeds to step S63. The transmission power converting section 111 sets the transmission period of the reception quality message to be shorter than the current period. Then, it proceeds to step S64.

Thus, in this case, due to the fact that the transmission period of the reception quality message is shortened, the frequency at which the reception quality message is transmitted from the terminal 102 becomes high.

On the other hand, in step S62, if the reception frequency of NACK is judged to be less than the predetermined threshold TH1, that is, if the reception frequency of NACK is low, and therefore packet data can often be received properly at the terminal 102, step S63 is skipped, and it proceeds to step S64.

In step S64, the transmission power converting section 111 judges if the predictive equation of equation (1) (the parameters a and b defining it) is updated.

In other words, by performing the process of step S48 of FIG. 17, the predictive equation of equation (1) is updated. However, in step S64, it is judged if such an update of the predictive equation has been performed after the process in step S64 of the previous round was performed.

In step S64, if it is judged that the updating of the predictive equation of equation (1) has not been performed, steps S65 through S68 are skipped, and it returns.

In this case, the transmission period of the reception quality message remains as it is.

In addition, in step S64, if it is judged that the predictive equation of equation (1) has been performed, it proceeds to step S65. The transmission power converting section 111 judges if the square error E of equation (4) obtained with the predictive equation is less than (or at or below) a predetermined low threshold TH2.

In addition, the square error E of equation (4) is calculated using the transmission power x[n] and the reception quality y[n] which are the training samples used in updating (training) the predictive equation of equation (1).

In step S65, if it is judged that the square error E is not less than the predetermined threshold TH2, that is, if the square error E is relatively large and, therefore, the accuracy of the predicted value of the reception quality obtained with the predictive equation of equation (1) is not bad but is not highly accurate either, it proceeds to step S66. The transmission power converting section 111 sets the transmission period of the reception quality message to be shorter than the current period, and it returns.

Thus, in this case, due to the fact that the transmission period of the reception quality message is shortened, the frequency at which the reception quality message is transmitted from the terminal 102 becomes high.

In addition, in step S66 (as in step S68 which will be described later), if the transmission period is already altered, for example, the transmission period is set (altered) anew with the altered transmission period as the current period.

On the other hand, in step S65, if the square error E is judged to be less than the predetermined threshold TH2, that is, if the square error E is relatively small and, therefore, the accuracy of the predicted value of the reception quality calculated with the predictive equation of equation (1) is relatively high in accuracy, it proceeds to step S67. The transmission power converting section 111 judges if the square error E is less than (or at or below) a threshold TH3 still smaller than the threshold TH2.

In step S67, if it is judged that the square error E is not less than the predetermined threshold TH3, that is, if the square error E is smaller than the threshold TH2 but is not smaller than the threshold TH3, and therefore, the accuracy of the predicted value of the reception quality calculated with the predictive equation of equation (1) is relatively high in accuracy, step S68 is skipped and it returns.

In this case, the transmission period of the reception quality message is kept as it is.

In addition, in step S67, if the square error E is judged to be less than the predetermined threshold TH3, that is, if the square error E is smaller than the threshold TH3 that is smaller than the threshold TH2 and, therefore, the accuracy of the predicted value of the reception quality calculated with the predictive equation of equation (1) is extremely high in accuracy, it proceeds to step S68. The transmission power converting section 111 sets the transmission period of the reception quality message to be longer than the current period, and it returns.

Thus, in this case, due to the fact that the transmission period of the reception quality message is lengthened, the frequency at which the reception quality message is transmitted from the terminal 102 becomes low.

In addition, in step S62, instead of the reception frequency of NACK, the magnitude of the reception frequency of ACK may be judged.

Moreover, in steps S65, S67, instead of the square error E, for example, the size of the prediction error e[n], expressed by equation (2), between the reception quality y[n] represented by the most recently received reception quality message and the predicted value y'[n] of the reception quality calculated with equation (1) may be judged.

Thus, by setting the transmission period of the reception quality message in accordance with the NACK reception frequency and the square error E, at the terminal 102, for example, as shown in FIG. 19, although the reception quality message is transmitted in frame periods at first, the transmission period gradually becomes longer, and ultimately (ideally), it is no longer transmitted.

In other words, if the predicted value y'[n] of the reception quality calculated from equation (1) is of a high accuracy, the square error E is reduced. Moreover, at the base station 101, because the transmission mode determined based on that predicted value y'[n] corresponds to the actual reception quality at the terminal 102, at the terminal 102, the likelihood of being able to receive packet data properly becomes high, and the NACK reception frequency becomes small. Hence, the transmission period of the reception quality message gradually becomes long. Ultimately, it is no longer transmitted (the transmission period becomes infinite).

In addition, if the propagation path characteristics between the base station 101 and the terminal 102 change rapidly, at the terminal 102, there may be cases where packet data cannot be received properly. Moreover, the accuracy of the predicted value y'[n] of the reception quality calculated from equation (1) may deteriorate. In this case, according to the process in accordance with the flowchart of FIG. 18, the transmission period of the reception quality message becomes short. Consequently, at the base station 101, it becomes more frequent that the transmission mode is determined in accordance with the reception quality indicated by the reception quality message actually transmitted from the terminal 102. Moreover, in this case, according to the process in accordance with the flowchart of FIG. 17, in step S48, the chances of the training of the predictive equation of equation (1) being performed increases. Consequently, a predictive equation (the parameters a and b defining it) that is capable of calculating a highly accurate predicted value y'[n] in accordance with the rapidly changed propagation path characteristics is quickly obtained. Then, after the predictive equation that is capable of obtaining the highly accurate predicted value y'[n] in accordance with the rapidly changed propagation path characteristics, as shown in FIG. 19, the transmission period of the reception quality message is gradually made longer again.

Thus, in this case, it is possible to reduce the power consumption at the terminal 102, and also to save radio resources for transmitting the reception quality message, and further it is possible to adaptively change the transmission frequency of the reception quality message depending on whether or not the terminal 102 is receiving packet data properly, or in accordance with the accuracy of the predicted value y'[n].

Figure 20:
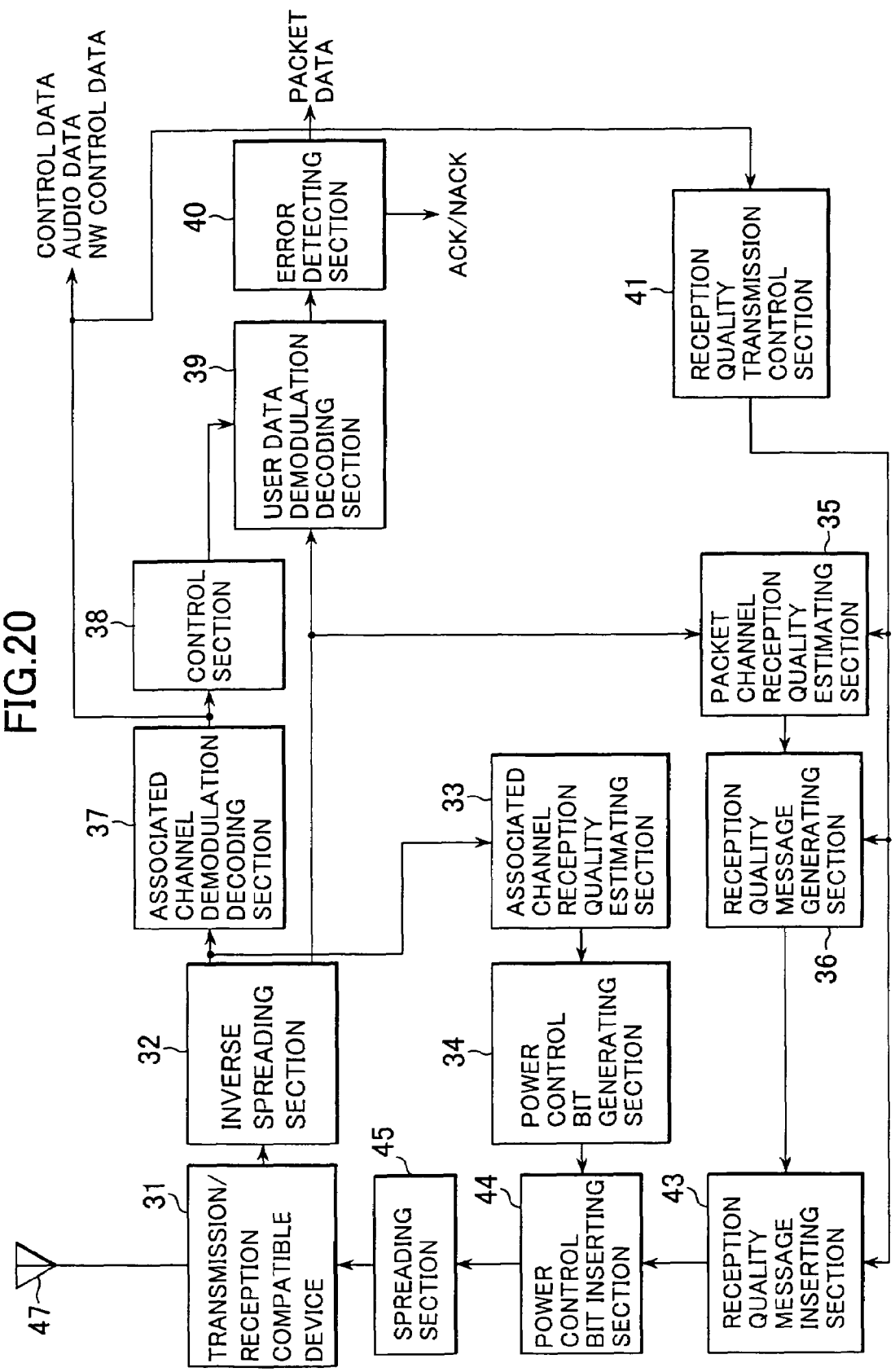
FIG. 20 is a block diagram showing a configuration example of a terminal 102.

Next, FIG. 20 shows a configuration example of the terminal 102 of FIG. 8. In addition, in the figure, the same symbols are assigned to portions corresponding to the case in FIG. 7, and hereinafter, explanations thereof are omitted as deemed appropriate.

In FIG. 20, the terminal (the user terminal) comprises a transmission/reception compatible device 31, an inverse spreading section 32, an associated channel reception quality estimating section 33, a power control bit generating section 34, a packet channel reception quality estimating section 35, a reception quality message generating section 36, an associated channel demodulation decoding section 37, a control section 38, a user data demodulation decoding section 39, an error detecting section 40, a reception quality transmission control section 41, a reception quality message inserting section 43, a power control bit inserting section 44, a spreading section 45, and an antenna 47.

Therefore, the terminal 102 of FIG. 20 is configured basically similar to the terminal of FIG. 7 except in that the reception quality transmission control section 41 is additionally provided.

The control data, which is demodulated and decoded by the associated channel demodulation decoding section 37, is supplied to the reception quality transmission control section 41. Based on the transmission control information included in the control data, the reception quality transmission control section 41 controls the transmission of the reception quality message representing the reception quality of the packet channel by controlling the packet channel reception quality estimating section 35, the reception quality message generating section 36 and the reception quality message inserting section 43.

The outline of the process at the terminal 102 thus configured is as follows.

1. The associated channel data is inputted to the associated channel demodulation decoding section 37, and the control data, the audio data and the NW control data are demodulated and decoded. The control section 38 detects the encoding method and the modulation method information (the transmission mode) applied to the packet channel, and carries out the mode setting (control) of the user data demodulation decoding section 39 based on the detection result.

2. The packet channel separated by the inverse spreading section 32 has a demodulation decoding process performed thereon at the user data demodulation section 39 and is outputted as reception packet data. The transmission control information inserted into the associated channel is extracted by the reception quality transmission control section 41.

3. The reception quality transmission control section 41, in accordance with the transmission control information, reports to the packet channel reception quality estimating section 35, the reception quality message generating section 36 and the reception message inserting section 43 the presence or absence (or the period) of a transmission of the reception quality message of the packet channel. The presence/absence of a transmission or the period of transmission of the reception quality message of the packet channel mentioned above is reported from the side of the base station 101. More specifically, the associated channel demodulation decoding section 37 reports to the reception quality transmission control section 41 the information regarding the presence/absence or the period of a transmission obtained by demodulating and decoding the control data, which was inserted into the associated channel and transmitted, in other words, the transmission control information.

4. The packet channel reception quality estimating section 35, the reception quality message generating section 36 and the reception message inserting section 43 execute respective processes in specified periods. In other words, the packet channel reception quality estimating section 35 estimates the signal to noise ratio as the reception quality (SIR) of the packet channel. In the method of estimating the signal to noise ratio is used a pilot symbol time-multiplexed on the packet channel or a pilot channel symbol transmitted in parallel with the packet channel. The estimated reception quality (SIR) is converted into a predetermined message format (for example, the SIR is converted into binary digits) by the reception quality message generating section 36.

5. The associated channel reception quality estimating section 33 estimates the signal to noise ratio as the reception quality (SIR) of the associated channel from the pilot signal time multiplexed on the associated channel. The estimated reception quality is inputted to the power control generating section 34. If the estimated reception quality is better than the desired SNR, −1 is outputted, and if worse, +1 is outputted. This process is executed for each slot and is used for the purpose of controlling the transmission power of the channel such that the associated channel can always be received at a constant SNR.

6. The reception quality message of the packet channel and the power control bit of the associated channel are inserted into the uplink control channel data by the reception quality inserting section 43 and the power control bit inserting section 44, respectively, and are transmitted to the base station 101 via the spreading section 45, the transmission/reception compatible device 31 and the antenna 47.

Thus, in the communications system of FIG. 8, the reception quality of a first channel (the packet channel) is estimated (predicted) from the transmission power of a second channel (the associated channel) on which the power control is performed. In other words, the transmission power of the second channel is mapped to the reception quality of the first channel transmitted from the receiving side, and the reception quality estimate value (predicted value) of the first channel obtained through this mapping is obtained. Then, this reception quality estimate value is used to determine the modulating and encoding method, and adaptive control of the modulating and encoding methods is carried out.

In other words, the base station 101 or the base station control station serving as the transmitting side controls the presence or absence of the transmission of the reception quality message. Immediately after a packet data call is generated, the mobile station (the terminal 102) transmits the reception quality message, and the base station 101 or the base station control station derives the packet channel reception quality from the reception quality message. In addition, the base station 101 maps (trains) the transmission power of the associated channel to the reception quality value indicated by the reception quality message, and instructs the stopping and the like of the reception quality message to the mobile station after training is finished. Then, it makes a transition to a mode that derives the packet channel reception quality directly from the associated channel transmission power.

Thus, by providing a mechanism for correlating the associated channel transmission power and the packet channel reception quality, it becomes possible to eliminate the transmission of the reception quality message without sacrificing transmission efficiency and to thereby contribute to a reduction in the power consumption of the mobile station and the effective utilization of radio resources.

Next, the process at the terminal 102 of FIG. 20 will further be described with reference to the flowcharts of FIG. 21 through FIG. 23.

First, the process performed by the terminal 102, which is related to the packet channel and the associated channel that process the signals of the packet channel and the associated channel, is explained with reference to the flowchart of FIG. 21.

Figure 1:
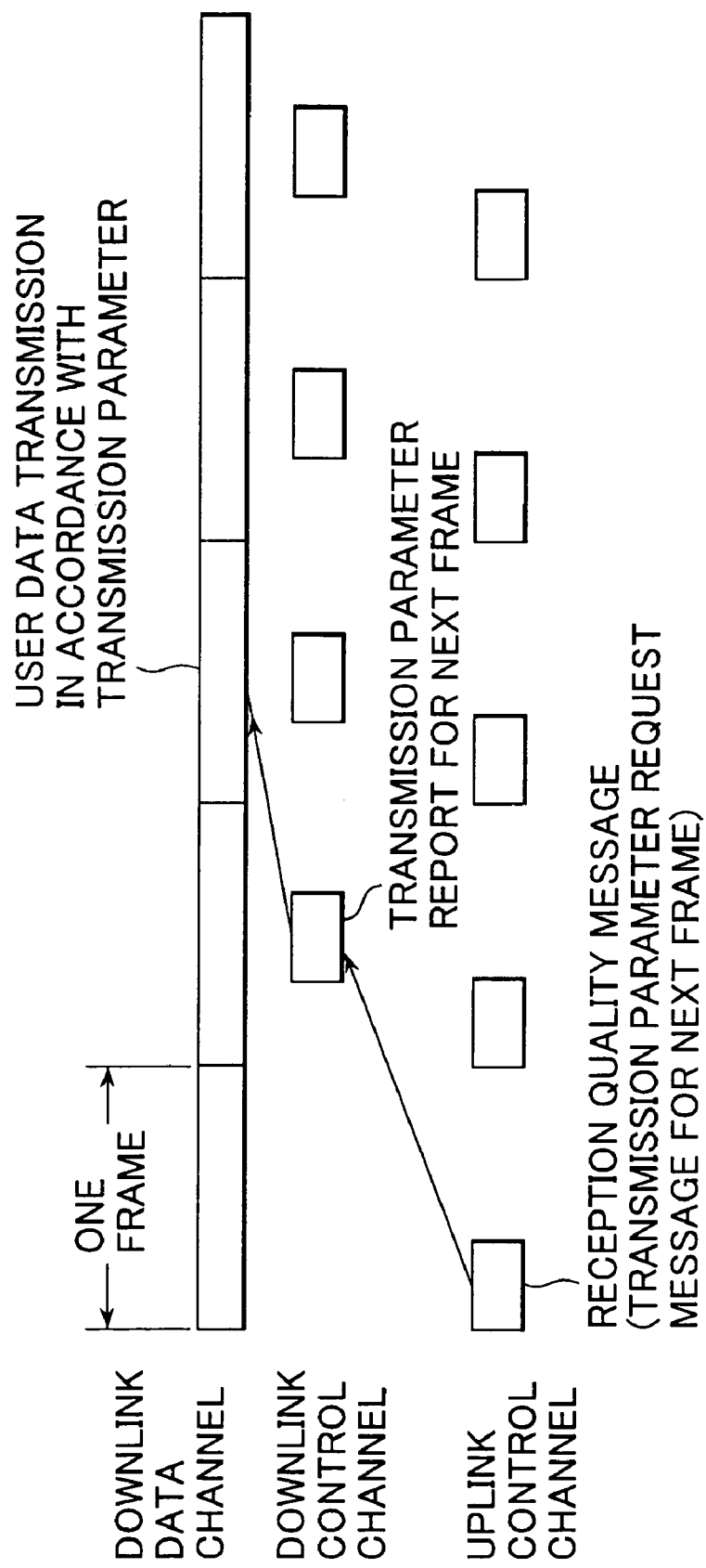
FIG. 1 is a view explaining conventional data transmission.

First, in step S81, the signals of the packet channel and the associated channel transmitted from the base station 101 are received. In other words, in step S81, the signals of the packet channel and the associated channel from the base station 101 are received by the antenna 47, and supplied to the inverse spreading section 32 after necessary processing is performed at the transmission/reception compatible device 31. Moreover, in step S81, the inverse spreading section 32 performs a spread spectrum on the signal from the transmission/reception compatible device 31 and thereby separates it into the signal of the packet channel of FIG. 1 and the signal of the associated channel. Then, the inverse spreading section 32 supplies the signal of the associated channel to the associated channel reception quality estimating section 33 and the associated channel demodulation decoding section 37. Moreover, the inverse spreading section 32 supplies the signal of the packet channel to the packet channel reception quality estimating section 35 and the user data demodulation decoding section 39.

After that, it proceeds to step S82. The associated channel demodulation decoding section 37 demodulates and decodes the signal of the associated channel supplied from the inverse spreading section 32 and outputs the control data, the audio data and the NW control data obtained as a result. It proceeds to step S83.

In step S83, the reception quality transmission control section 41 extracts the transmission control information included in the control data outputted by the associated channel demodulation decoding section 37, and sets a transmission period P of the reception quality message indicated by the transmission control information in the packet channel reception quality estimating section 35, the reception quality message generating section 36 and the reception quality message inserting section 43. Then, it proceeds to step S84.

In step S84, the control section 38 recognizes the transmission mode included in the control data supplied from the associated channel demodulation decoding section 37. Then, it proceeds to step S85.

In step S85, the control section 38 judges if the transmission mode is #0. In step S85, if the transmission mode is judged to be #0, it proceeds to step S86. The control section 38 controls the user data demodulation decoding section 39 such that the packet channel signal supplied from the inverse spreading section 32 is QPSK demodulated and further decoded at a code rate of R=½. Moreover, in step S86, the user data demodulation decoding section 39 supplies to the error detecting section 40 the user data arranged in the packet data obtained by demodulating and decoding the signal of the packet channel. Then, it proceeds to step S91.

In addition, in step S85, if it is judged that the transmission mode is not #0, it proceeds to step S87. The control section 38 judges if the transmission mode is #1. In step S87, if the transmission mode is judged to be #1, it proceeds to step S88. The control section 38 controls the user data demodulation decoding section 39 such that the packet channel signal supplied from the inverse spreading section 32 is 16 QAM demodulated and further decoded at a code rate of R=½. Moreover, in step S88, the user data demodulation decoding section 39 supplies to the error detecting section 40 the user data arranged in the packet data obtained by demodulating and decoding the signal of the packet channel. Then, it proceeds to step S91.

In addition, in step S87, if it is judged that the transmission mode is not #1, it proceeds to step S89. The control section 38 judges if the transmission mode supplied from the associated channel demodulation decoding section 37 is #2. In step S89, if it is judged that the transmission mode is not #2, steps S91 to S94 are skipped, and it returns to step S81.

In addition, in step S89, if the transmission mode is judged to be #2, it proceeds to step S90. The control section 38 controls the user data demodulation decoding section 39 such that the packet channel signal supplied from the inverse spreading section 32 is 16 QAM demodulated and further decoded at a code rate of R=¾. Moreover, in step S90, the user data demodulation decoding section 39 supplies to the error detecting section 40 the user data arranged in the packet data obtained by demodulating and decoding the signal of the packet channel. Then, it proceeds to step S91.

In step S91, the error detecting section 40 carries out error detection with regard to the user data supplied from the user data demodulation decoding section 39, and it proceeds to step S92. In step S92, the error detecting section 40 judges if an error is detected from the user data through the process in step S91.

In step S92, if it is judged that an error is not detected from the user data, it proceeds to step S93. The error detecting section 40 outputs ACK indicating that the user data is received properly. Then, it returns to step S81. Thereafter, similar processes are repeated.

In addition, in step S92, if it is judged that an error is detected from the user data, it proceeds to step S94. The error detecting section 40 outputs NACK indicating that the user data is not received properly. Then, it returns to step S81. Thereafter, similar processes are repeated.

In addition, ACK/NACK outputted by the error detecting section 40 is transmitted to the base station 101 as explained in FIG. 7.

Next the reception quality message transmission process carried out by the terminal 102 and for transmitting the reception quality message will be described below with reference to the flowchart of FIG. 22.

First, in step S101, the packet channel reception quality estimating section 35, the reception quality message generating section 36 and the reception quality message inserting section 43 set, for example, 0 as an initial value in a variable p that counts frames, and it proceeds to step S102. In step S102, the packet channel reception quality estimating section 35, the reception quality message generating section 36 and the reception quality message inserting section 43 increment the variable p by just 1, and it proceeds to step S103.

Figure 21:
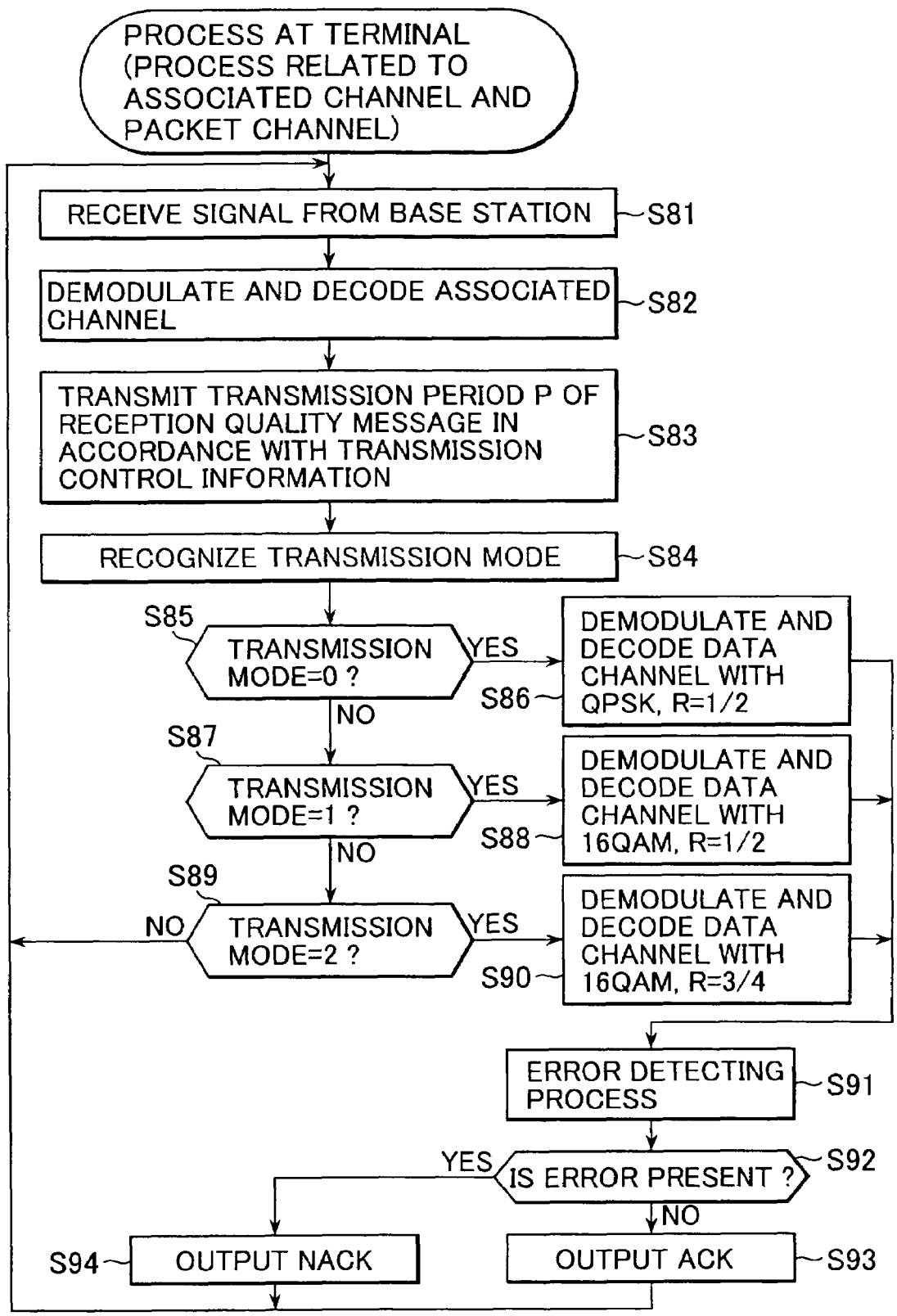
FIG. 21 is a flowchart explaining a process at the terminal 102.

In step S103, the packet channel reception quality estimating section 35, the reception quality message generating section 36 and the reception quality message inserting section 43 judge if the variable p is equal to or greater than the transmission period P that was set in step S83 of FIG. 21. In step S103, if it is judged that the variable p is not equal to nor greater than the transmission period P, a lapse of time corresponding to one frame of the uplink control channel is awaited, and it returns to step S102. Thereafter, similar processes are repeated.

In addition, in step S103, if the variable p is judged to be equal to or greater than the transmission period P, that is, if a period of time equal to or greater than P has lapsed since the last transmission of the reception quality message, it proceeds to step S104. The packet channel reception quality estimating section 35 estimates the SNR, in other words the reception quality, of the signal of the packet channel supplied from the inverse spreading section 32, and supplies it to the reception quality message generating section 36. Then, it proceeds to step S105.

In step S105, the reception quality message generating section 36 generates a reception quality message indicating the reception quality of the packet channel at the terminal supplied from the packet channel reception quality estimating section 35, and supplies it to the reception quality message inserting section 43. Then, it proceeds to step S106.

In step S106, the reception quality message inserting section 43 inserts (frames) the reception quality message supplied from the reception quality message generating section 36 into the data of the uplink control channel. Thus, the reception quality message is transmitted through the uplink control channel. It returns to step S101.

In other words, in this case, the reception quality message is transmitted to the base station 101 from the reception quality message inserting section 43 by the uplink control channel via the power control bit inserting section 44, the spreading section 45, the transmission/reception compatible device 31 and the antenna 47.

Figure 22:
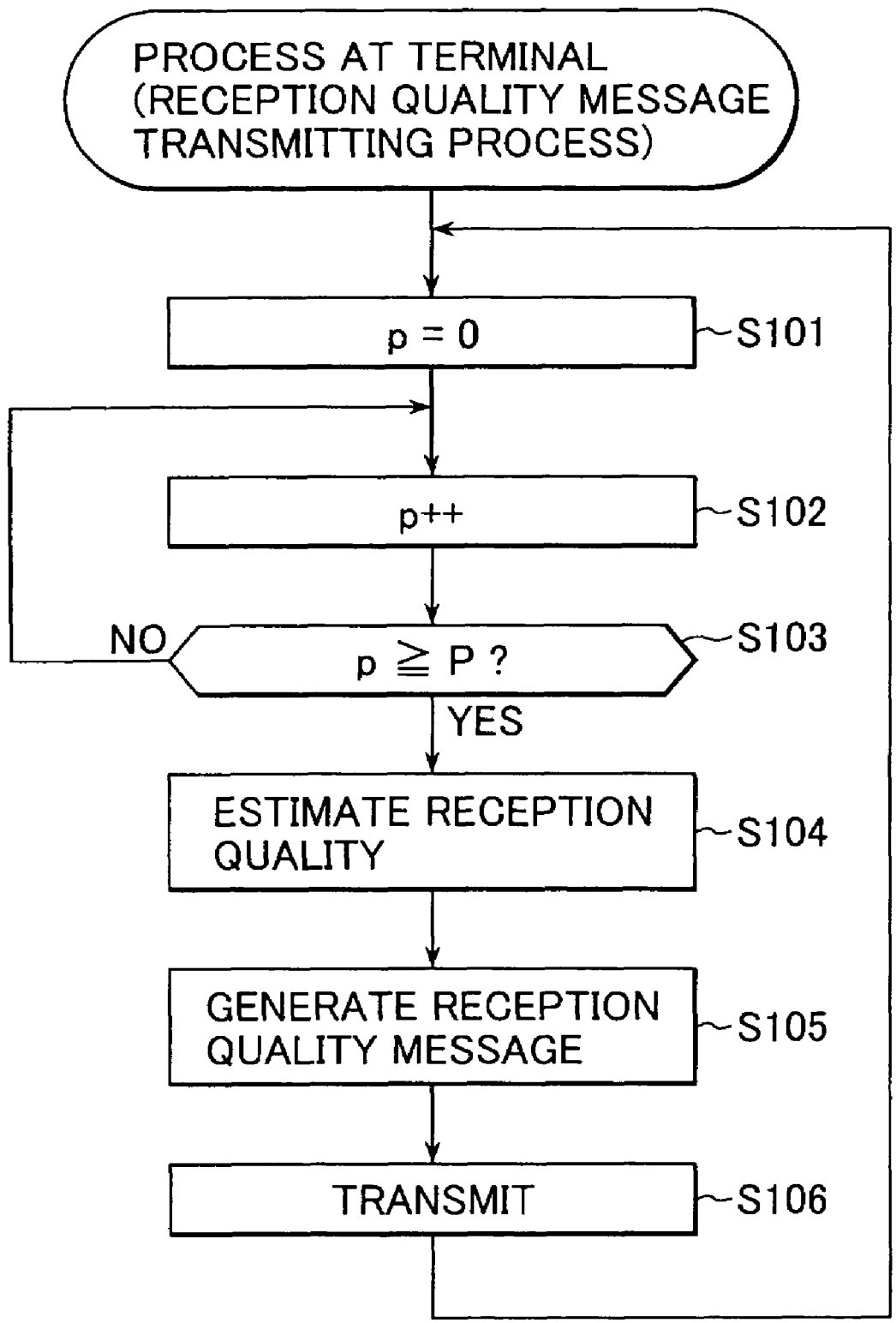
FIG. 22 is a flowchart explaining a process at the terminal 102.

Thus, in the reception quality message transmitting process of FIG. 22, because it is transmitted per P frames represented by the transmission period P set in step S83 of FIG. 21, in other words, at the terminal 102, because the reception quality message is transmitted in transmission periods indicated by the transmission control information transmitted from the base station 101, power consumption can be reduced to thereby save radio resources.

In addition, in cases where the reception quality message is to be transmitted in periods of a frame or is not to be transmitted at all, the transmission period P is set to 1 or to infinity.

In addition, the transmission period P can be set to a value smaller than 1. In this case, the reception quality message is updated more frequently than the conventional terminal of FIG. 7.

Next, the power control bit transmitting process carried out by the terminal 102 and for transmitting the power control bit will be described below with reference to the flowchart of FIG. 23.

First, in step S111, the associated channel reception quality estimating section 33 estimates the reception quality that is the SNR of the signal of the associated channel, and supplies the estimated reception quality to the power control bit generating section 34. Then, it proceeds to step S112.

In step S112, the power control bit generating section 34 judges if the estimated reception quality of the associated channel is better than a desired reception quality that is a desired SNR. In step S112, if it is judged that the estimated reception quality is not better than the desired reception quality, it proceeds to step S113. The power control bit generating section 34 generates a power control bit whose value is 1. This power control bit is transmitted from the power control bit generating section 34 to the base station 101 by the uplink control channel via the power control bit inserting section 44, the spreading section 45, the transmission/reception compatible device 31 and the antenna 47. After that, it returns to step S111. Thereafter, similar processes are repeated.

In addition, in step S112, if the estimated reception quality is judged to be better than the desired reception quality, it proceeds to step S114. The power control bit generating section 34 generates a power control bit whose value is 0. This power control bit is transmitted from the power control bit generating section 34 to the base station 101 by the uplink control channel via the power control bit inserting section 44, the spreading section 45, the transmission/reception compatible device 31 and the antenna 47. After that, it returns to step S111. Thereafter, similar processes are repeated.

Next, the series of processes at the transmission power converting section 111 of the base station 101, the reception quality transmission control section 41 of the terminal 102 and the like may be carried out with hardware and they can also be carried out through software. If the series of processes are carried out through software, a program constituting the software is installed in a general purpose computer and the like.

As such, FIG. 24 shows a configuration example of an embodiment of a computer in which a program for executing the series of processes mentioned above is installed.

The program can be recorded in advance on a hard disk 205 or in a ROM 203 as recording media built into the computer.

Alternatively, the program can be temporarily or permanently stored (recorded) on a removable recording medium 211, such as a flexible disk, a CD-ROM (Compact Disc Read Only Memory), an MO (Magneto Optical) disc, a DVD (Digital Versatile Disc), a magnetic disk, a semiconductor memory and the like. Such a removable recording medium 211 can be provided as so-called packaged software.

In addition, the program, aside from being installed in the computer from the removable recording medium 211 as mentioned above, can be transferred wirelessly from a download site to the computer through an artificial satellite for digital satellite broadcasting, or be transferred to the computer by wire via a network such as a LAN (Local Area Network) or the Internet. Then, at the computer, the program thus transferred can be received by a communication section 208 and installed in a built-in hard disk 205.

A CPU (Central Processing Unit) 202 is built into the computer. An input output interface 210 is connected to the CPU 202 via a bus 201. When command is inputted via the input output interface 210 by having an input section 207 comprising a keyboard, a mouse, a microphone or the like operated on by a user, the CPU 202, in accordance therewith, executes the program stored in the ROM (Read Only Memory) 203. Alternatively, the CPU 202 loads into a RAM (Random Access Memory) and executes the program stored in the hard disk 205, the program that is transferred from a satellite or a network and received by the communication section 208 and then installed in the hard disk 205, or the program that is read out from the removable recording medium 211 inserted into a drive 209 and then installed in the hard disk 205. Thus, the CPU 202 carries out the process in accordance with the above-mentioned flowchart, or the process that is performed with the configuration of the above-mentioned block diagram. Then, the CPU 202 outputs the process result, as required, for example, from an output section 206 comprising an LCD (Liquid Crystal Display), a speaker or the like via the input output interface 210, or transmits it from the communication section 208, and further records it on the hard disk 205.

Here, in the present specification, the process steps that describe the program for making the computer execute various processes do not necessarily have to be processed chronologically in the order listed in the flowchart and also include processes to be executed in parallel or individually (for example, parallel processing or processing by object).

In addition, the program may be processed by one computer or the process may be distributed among a plurality of computers. Moreover, the program may be transferred to a remote computer and be executed.

In addition, the present invention can be applied to any communications system in which data is exchanged between the base station 101 and the terminal 102 using a plurality of channels, and the reception quality of one channel among the plurality of channels is reported from the terminal 102 to the base station 101, and the base station 101 controls the transmission power of one other channel.

Here, for example, because in the W-CDMA system, at the terminal, the reception quality message indicating the reception quality of the packet channel is transmitted to the base station, it is a matter of course that the present invention can be applied to a communications system, such as the W-CDMA system, in which the terminal 102 transmits a reception quality message to the base station 101 but it is also applicable to, for example, a communications system, such as an HDR system.

In other words, in an HDR system and the like, at the terminal 102, the transmission mode is determined based on the reception quality of the packet channel, and a mode request message indicating that the transmission mode is transmitted to the base station 101. However, because the mode request message is determined based on the reception quality of packets, the reception quality of the packet channel can be estimated from the mode request message. Hence, the mode request message can be considered equivalent to the reception quality message. The present invention can also be applied to a communications system of an HDR system in which the mode request message that is equivalent to such a reception quality message is transmitted from the terminal 102 to the base station 101.

Also, it is possible to make the base station control station, not shown in drawing, for controlling the base station 101 perform the process at the base station 101.

Moreover, the present invention can be applied to both wireless and wired communications systems. In addition, whether the terminal 102 is of a portable type or a stationary type does not impede the application of the present invention.

INDUSTRIAL APPLICABILITY

Thus, according to the present invention, wireless resources can be saved and power consumption can also be reduced.

The invention claimed is:

1. A transmission apparatus which uses a first channel through which data is transmitted and a second channel on which power control is performed to transmit said data, said transmission apparatus comprising:
   transmission power control means for controlling the transmission power of said second channel;
   training means for obtaining correlation information that correlates the reception quality of said first channel transmitted from a reception apparatus for receiving said data and the transmission power of said second channel;
   predicting means for obtaining a predicted value of the reception quality of said first channel using the transmission power of said second channel based on said correlation information; and
   transmission controlling means for controlling the transmission of said data through said first channel based on the predicted value of the reception quality of said first channel, wherein the predicted value is judged based on a predetermined threshold value correlated to a frequency of transmitted acknowledgements corresponding to said training means, and wherein the transmission controlling means increases the frequency that the reception quality of said first channel is transmitted from the reception apparatus when the predicted value is above the predetermined threshold value and decreases the frequency that the reception quality of the first channel is transmitted from the reception apparatus when the predicted value is below the predetermined threshold value, and wherein the reception quality is transmitted more frequently when the predicted value is above the predetermined threshold value.

2. The transmission apparatus according to claim 1, wherein said training means correlates the reception quality of said first channel and the transmission power of said second channel so as to minimize a statistical error between the reception quality of said first channel transmitted from said reception apparatus and the predicted value of the reception quality of said first channel obtained using the transmission power of said second channel.

3. The transmission apparatus according to claim 1,
wherein said training means obtains said correlation information during a training period in which said reception apparatus is made to transmit said first reception quality,
wherein said predicting means calculates the predicted value of the reception quality of said first channel using the transmission power of said second channel based on said correlation information after a lapse of said training period, and
further comprising a transmission control information transmitting means for transmitting transmission control information, which, with respect to said reception apparatus, controls the transmission of the reception quality of said first channel from said reception apparatus after a lapse of said training period.

4. The transmission apparatus according to claim 3, wherein said transmission control information instructs the starting or the stopping of transmission of the reception quality of said first channel by said reception apparatus.

5. The transmission apparatus according to claim 3, wherein said transmission control information indicates the transmission frequency of the reception quality of said first channel by said reception apparatus.

6. The transmission apparatus according to claim 1, wherein said training means, each time the reception quality of said first channel is transmitted from said reception apparatus, updates said correlation information by obtaining said correlation information using the reception quality of that first channel.

7. The transmission apparatus according to claim 1, wherein said transmission controlling means controls a code rate or a modulation of said data transmitted through said first channel based on the predicted value of the reception quality of said first channel.

8. The transmission apparatus according to claim 1, further comprising transmission control information transmitting means for transmitting to said reception apparatus transmission control information, which controls the transmission of the reception quality of said first channel by said reception apparatus.

9. The transmission apparatus according to claim 8, wherein said transmission control information instructs the starting or the stopping of transmission of the reception quality of said first channel by said reception apparatus.

10. The transmission apparatus according to claim 8, wherein said transmission control information instructs a transmission frequency of the reception quality of said first channel by said reception apparatus.

11. The transmission apparatus according to claim 10, further comprising generating means for setting the transmission frequency of the reception quality of said first channel based on an error in the predicted value of the reception quality of the first channel, and for generating said transmission control information indicating that transmission frequency.

12. The transmission apparatus according to claim 10, further comprising generating means for setting the transmission frequency of the reception quality of said first channel based on the frequency of proper reception of said data at said reception apparatus, and for generating said transmission control information indicating that transmission frequency.

13. The transmission apparatus according to claim 8, wherein said transmission control information transmitting means transmits said transmission control information through said second channel.

14. The transmission apparatus according to claim 1, wherein said transmission power controlling means controls the transmission power of said second channel in accordance with power control information for controlling the transmission power of said second channel, which is transmitted from said reception apparatus.

15. A transmission control method for a transmission apparatus that uses a first channel through which data is transmitted and a second channel on which power control is performed to transmit said data, said transmission control method comprising:
a transmission power controlling step for controlling the transmission power of said second channel;
a training step for carrying out training to obtain correlation information that correlates the reception quality of said first channel transmitted from a reception apparatus for receiving said data and the transmission power of said second channel;
a predicting step for calculating a predicted value of the reception quality of said first channel using the transmission power of said second channel based on said correlation information;
a transmission controlling step for controlling the transmission of said data through said first channel based on the predicted value of the reception quality of said first channel;
a judging step for judging the predicted value against a predetermined threshold value correlated to a frequency of transmitted acknowledgements occurring within said training step; and
a changing step for changing the transmission frequency of the reception quality of said first channel transmitted from the reception apparatus,
wherein the transmission changing step increases the frequency that the reception quality of said first channel is transmitted from the reception apparatus when the predicted value is above the predetermined threshold value and decreases the frequency that the reception quality of the first channel is transmitted from the reception apparatus when the predicted value is below the predetermined threshold value, and
wherein the reception quality is transmitted more frequently when the predicted value is above the predetermined threshold value.

16. A computer readable medium storing a program for making a computer execute a transmission control process for a transmission apparatus that uses a first channel through which data is transmitted and a second channel on which power control is performed, and transmits said data, said program comprising:
- a transmission power controlling step for controlling the transmission power of said second channel;
- a training step for carrying out training to obtain correlation information that correlates the reception quality of said first channel transmitted from a reception apparatus for receiving said data and the transmission power of said second channel;
- a predicting step for obtaining a predicted value of the reception quality of said first channel using the transmission power of said second channel based on said correlation information;
- a transmission controlling step for controlling the transmission of said data through said first channel based on the predicted value of the reception quality of said first channel;
- a judging step for judging the predicted value against a predetermined threshold value correlated to a frequency of transmitted acknowledgements occurring within said training step; and
providing the data to the transmission apparatus; and
- a changing step for changing the transmission frequency of the reception quality of said first channel transmitted from the reception apparatus,
- wherein the transmission changing step increases the frequency that the reception quality of said first channel is transmitted from the reception apparatus when the predicted value is above the predetermined threshold value and decreases the frequency that the reception quality of the first channel is transmitted from the reception apparatus when the predicted value is below the predetermined threshold value, and
- wherein the reception quality is transmitted more frequently when the predicted value is above the predetermined threshold value.

17. A reception apparatus that uses a first channel for data a second channel for power control, said reception apparatus comprising:
- reception quality obtaining means for obtaining a reception quality of said first channel;
- reception quality transmitting means for transmitting the reception quality of said first channel;
- power control information transmitting means for transmitting power control information that controls transmission power of said second channel;
- extracting means for extracting transmission control information that controls transmission of the reception quality of said first channel from the data of said second channel transmitted from a transmission apparatus; and
- transmission controlling means for controlling the transmission of the reception quality of said first channel based on said transmission control information,
- wherein the transmission control information includes a predicted value of the reception quality obtained via a transmission power converting section,
- wherein the predicted value is judged based on a predetermined threshold value correlated to a frequency of transmitted acknowledgements, and
- wherein the transmission controlling means increases the frequency that the reception quality of said first channel is transmitted from the reception apparatus when the predicted value is above the predetermined threshold value and decreases the frequency that the reception quality of the first channel is transmitted from the reception apparatus when the predicted value is below the predetermined threshold value, and
- wherein the reception quality is transmitted more frequently when the predicted value is above the predetermined threshold value.

18. The reception apparatus according to claim 17, wherein said transmission controlling means starts or stops the transmission of the reception quality of said first channel based on said transmission control information.

19. The reception apparatus according to claim 17, wherein said transmission controlling means controls transmission frequency of the reception quality of said first channel based on said transmission control information.

20. A reception control method for a reception apparatus that uses a first channel for data and a second channel for power control, said reception control method comprising:
- a reception quality obtaining step for obtaining a reception quality of said first channel;
- a reception quality transmitting step for transmitting the reception quality of said first channel;
- a power control information transmitting step for transmitting power control information for controlling transmission power of said second channel;
- an extracting step for extracting transmission control information that controls transmission of the reception quality of said first channel from the data of said second channel transmitted from a transmission apparatus;
- a transmission controlling step for controlling the transmission of the reception quality of said first channel based on said transmission control information,
- wherein the transmission control information includes a predicted value of the reception quality obtained via a transmission power converting section; and
- a changing step for changing the transmission frequency of the reception quality of said first channel; and
- a judging step for judging the predicted value against a predetermined threshold value correlated to a frequency of transmitted acknowledgements,
- wherein the transmission controlling step increases the frequency that the reception quality of said first channel is transmitted from the reception apparatus when the predicted value is above the predetermined threshold value and decreases the frequency that the reception quality of the first channel is transmitted from the reception apparatus when the predicted value is below the predetermined threshold value, and
- wherein the reception quality is transmitted more frequently when the predicted value is above the predetermined threshold value.

21. A computer readable storing a program for making a computer perform a reception control process for a reception apparatus that uses a first channel for data and a second channel for power control, said program comprising:
- a reception quality obtaining step for obtaining a reception quality of said first channel;
- a reception quality transmitting step for transmitting the reception quality of said first channel to a transmission apparatus;
- a power control information transmitting step for transmitting power control information for controlling the transmission power of said second channel to said transmission apparatus;
- an extracting step for extracting transmission control information for controlling transmission of the reception quality of said first channel from the data of said second channel transmitted from said transmission apparatus;

a transmission controlling step for controlling the transmission of the reception quality of said first channel based on said transmission control information,
wherein the transmission control information includes a predicted value of the reception quality obtained via a transmission power converting section;
a changing step for changing the transmission frequency of the reception quality of said first channel;
a judging step for judging the predicted value against a predetermined threshold value correlated to a frequency of transmitted acknowledgements; and
providing the reception quality to the transmission apparatus,
wherein the changing step increases the frequency that the reception quality of said first channel is transmitted from the reception apparatus when the predicted value is above the predetermined threshold value and decreases the frequency that the reception quality of the first channel is transmitted from the reception apparatus when the predicted value is below the predetermined threshold value, and
wherein the reception quality is transmitted more frequently when the predicted value is above the predetermined threshold value.

22. A communications system, comprising:
a transmission apparatus that uses a first channel through which data is transmitted and a second channel on which power control is performed, and transmits said data; and
a reception apparatus for receiving said data transmitted from said transmission apparatus, said communications system wherein said transmission apparatus includes:
transmission power controlling means for controlling the transmission power of said second channel in accordance with power control information for controlling the transmission power of said second channel;
training means for carrying out training to obtain correlation information that correlates the reception quality of said first channel transmitted from said reception apparatus and the transmission power of said second channel;
predicting means for obtaining a predicted value of the reception quality of said first channel using the transmission power of said second channel based on said correlation information;
data transmission controlling means for controlling the transmission of said data through said first channel based on the predicted value of the reception quality of said first channel,
wherein the predicted value is judged based on a predetermined threshold value correlated to a frequency of transmitted acknowledgements corresponding to said training means; and
transmission control information transmitting means for transmitting to said reception apparatus through said second channel transmission control information that controls the transmission of the reception quality of said first channel by said reception apparatus; and said reception apparatus includes:
reception quality obtaining means for obtaining the reception quality of said first channel;
reception quality transmitting means for transmitting the reception quality of said first channel to said transmission apparatus;
power control information transmitting means for transmitting said power control information to said transmission apparatus;
extracting means for extracting said transmission control information from the data of said second channel transmitted from said transmission apparatus; and
reception quality transmission controlling means for controlling the transmission of the reception quality of said first channel based on said transmission control information,
wherein the transmission control information entails a predicted value of the reception quality obtained via a transmission power converting section, and
wherein the predicted value is judged based on a predetermined threshold value correlated to a frequency of transmitted acknowledgements, and
wherein the transmission controlling means increases the frequency that the reception quality of said first channel is transmitted from the reception apparatus when the predicted value is above the predetermined threshold value and decreases the frequency that the reception quality of the first channel is transmitted from the reception apparatus when the predicted value is below the predetermined threshold value, and
wherein the reception quality is transmitted more frequently when the predicted value is above the predetermined threshold value.

23. The transmission apparatus according to claim 1, wherein a transmission period of a reception quality message is altered based on the relationship between a reception frequency of an acknowledgement and a predetermined threshold.

24. The transmission apparatus of claim 1, wherein the periods in which the reception quality is transmitted are controlled to be lengthened as the statistical error approaches 0 (zero).

25. A transmission control device for a transmission apparatus that uses a first channel through which data is transmitted and a second channel on which power control is performed to transmit said data, comprising:
a transmission power controlling device configured to control the transmission power of said second channel;
a training device configured to carry out training to obtain correlation information that correlates the reception quality of said first channel transmitted from a reception apparatus for receiving said data and the transmission power of said second channel;
a predicting device configured to calculate a predicted value of the reception quality of said first channel using the transmission power of said second channel based on said correlation information;
a transmission controlling device configured to control the transmission of said data through said first channel based on the predicted value of the reception quality of said first channel;
a judging device configured to judge the predicted value against a predetermined threshold value correlated to a frequency of transmitted acknowledgements occurring within said training device; and
a changing device configured to change the transmission frequency of the reception quality of said first channel transmitted from the reception apparatus,
wherein the transmission changing device increases the frequency that the reception quality of said first channel is transmitted from the reception apparatus when the predicted value is above the predetermined threshold value and decreases the frequency that the reception quality of the first channel is transmitted from the reception apparatus when the predicted value is below the predetermined threshold value, and wherein the reception quality is transmitted more frequently when the predicted value is above the predetermined threshold value.

26. A reception control device for a reception apparatus that uses a first channel for data and a second channel for power control, comprising:

a reception quality obtaining device configured to obtain a reception quality of said first channel;

a reception quality transmitting device configured to transmit the reception quality of said first channel;

a power control information transmitting device configured to transmit power control information for controlling transmission power of said second channel;

an extracting device configured to extract transmission control information that controls transmission of the reception quality of said first channel from the data of said second channel transmitted from a transmission apparatus;

a transmission controlling device configured to control the transmission of the reception quality of said first channel based on said transmission control information, wherein the transmission control information includes a predicted value of the reception quality obtained via a transmission power converting section; and a changing device configured to change the transmission frequency of the reception quality of said first channel; and a judging device configured to judge the predicted value against a predetermined threshold value correlated to a frequency of transmitted acknowledgements, wherein the transmission controlling device increases the frequency that the reception quality of said first channel is transmitted from the reception apparatus when the predicted value is above the predetermined threshold value and decreases the frequency that the reception quality of the first channel is transmitted from the reception apparatus when the predicted value is below the predetermined threshold value, and wherein the reception quality is transmitted more frequently when the predicted value is above the predetermined threshold value.

* * * * *